United States Patent
Kawano et al.

(10) Patent No.: US 11,308,951 B2
(45) Date of Patent: Apr. 19, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Shinichi Kawano, Tokyo (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 195 days.

(21) Appl. No.: 16/471,101

(22) PCT Filed: Jan. 4, 2018

(86) PCT No.: PCT/JP2018/000015
§ 371 (c)(1),
(2) Date: Jun. 19, 2019

(87) PCT Pub. No.: WO2018/135303
PCT Pub. Date: Jul. 26, 2018

(65) Prior Publication Data
US 2020/0020332 A1    Jan. 16, 2020

(30) Foreign Application Priority Data
Jan. 18, 2017    (JP) .............................. JP2017-007122

(51) Int. Cl.
*G10L 15/22*    (2006.01)
*G10L 15/08*    (2006.01)
*G10L 15/26*    (2006.01)

(52) U.S. Cl.
CPC ............ *G10L 15/22* (2013.01); *G10L 15/083* (2013.01); *G10L 15/26* (2013.01); *G10L 2015/088* (2013.01); *G10L 2015/223* (2013.01)

(58) Field of Classification Search
CPC .......... G10L 15/22; G10L 15/00; G10L 15/01; G10L 15/08; G10L 15/083; G10L 15/18;
(Continued)

(56) References Cited

U.S. PATENT DOCUMENTS

| 5,794,189 A | 8/1998 | Gould |
| 9,666,208 B1 * | 5/2017 | Rubin .................... G06F 3/167 |

(Continued)

FOREIGN PATENT DOCUMENTS

| JP | H07-005891 A | 1/1995 |
| JP | 2005-202165 A | 7/2005 |
| JP | 2009-015148 A | 1/2009 |

OTHER PUBLICATIONS

Nakajima et al., Improved usability of character input by voice efficient speech recognition error correction technology, Technology Reports, Jul. 1, 2009, pp. 30-35, vol. 17, No. 2.

(Continued)

*Primary Examiner* — Qi Han
(74) *Attorney, Agent, or Firm* — Paratus Law Group, PLLC

(57) ABSTRACT

There is provided an information processing apparatus, an information processing method, and a program capable of providing a more convenient speech recognition service. The processing of recognizing, as an edited portion, a desired word configuring a sentence presented to a user as a speech recognition result, acquiring speech information repeatedly uttered for editing a word of the edited portion, and connecting speech information other than a repeated utterance to the speech information is performed, and speech information for speech recognition for editing is generated. Then, speech recognition is performed on the generated speech information for speech recognition for editing.

11 Claims, 22 Drawing Sheets

(58) Field of Classification Search
CPC ............. G10L 15/1815; G10L 15/1822; G10L 15/183; G10L 15/187; G10L 15/19; G10L 15/197; G10L 15/24; G10L 15/25; G10L 15/26; G10L 2015/22; G10L 2015/00; G10L 2015/06; G10L 2015/223; G10L 2015/225; G10L 2015/226; G10L 2015/228; G10L 2015/0631–0638; G10L 2015/221–228
USPC ....... 704/251, 231, 233, 235, 245, 250, 254, 704/257, 9, 270, 270.1, 276, 2, 78
See application file for complete search history.

(56) References Cited

U.S. PATENT DOCUMENTS

2006/0293889 A1* 12/2006 Kiss ................. G10L 15/22
  704/235
2017/0194000 A1* 7/2017 Itani ................. G10L 15/22

OTHER PUBLICATIONS

Translation of Dec. 7, 2021, Japanese Office Action for related JP application No. 2018-563263.

* cited by examiner

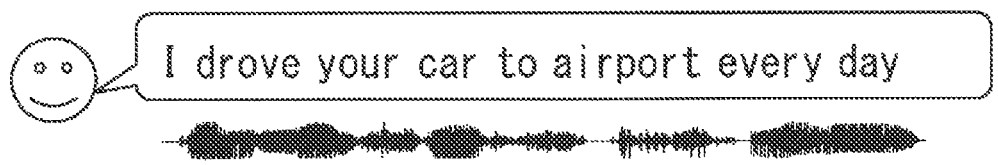
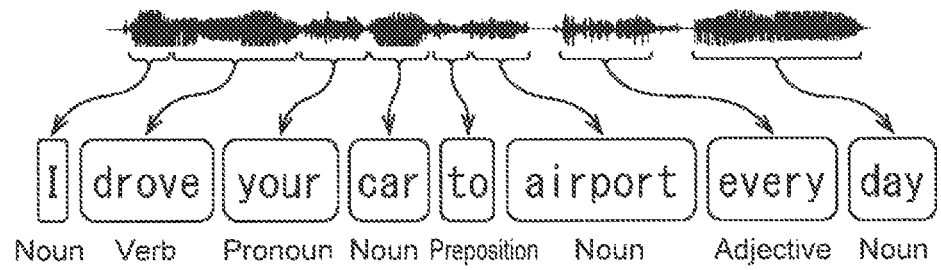
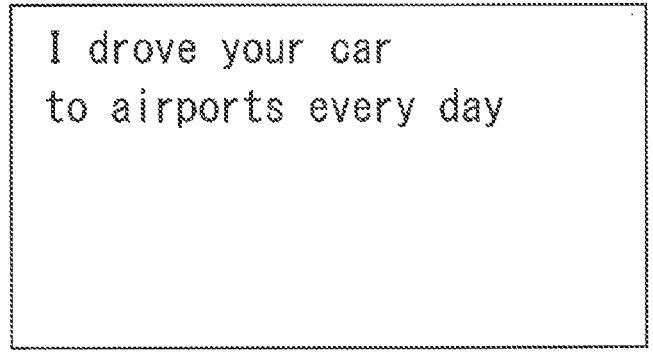
FIG.10

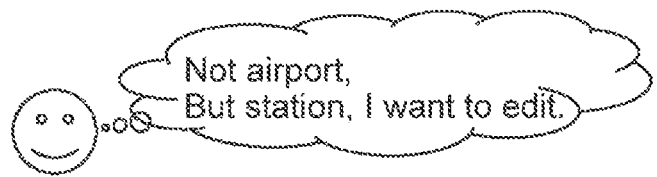
User interface
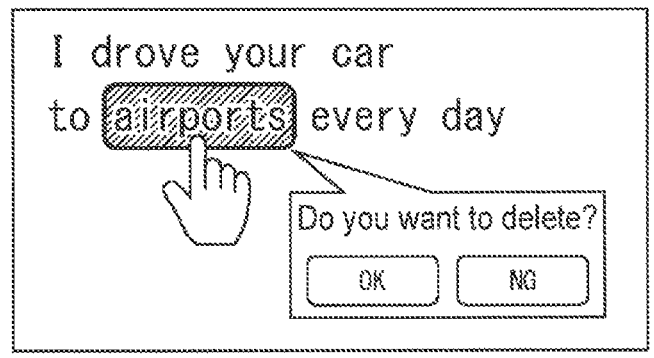
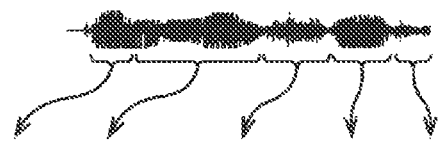 
FIG.11

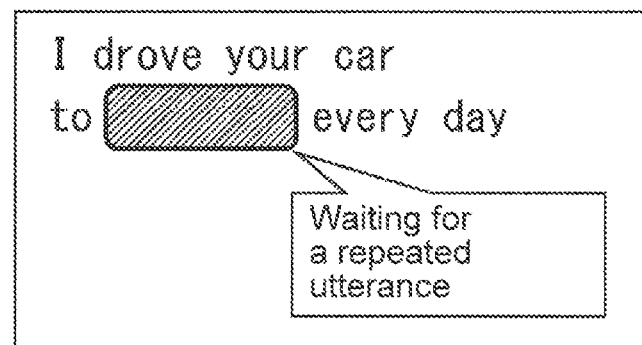
FIG.12

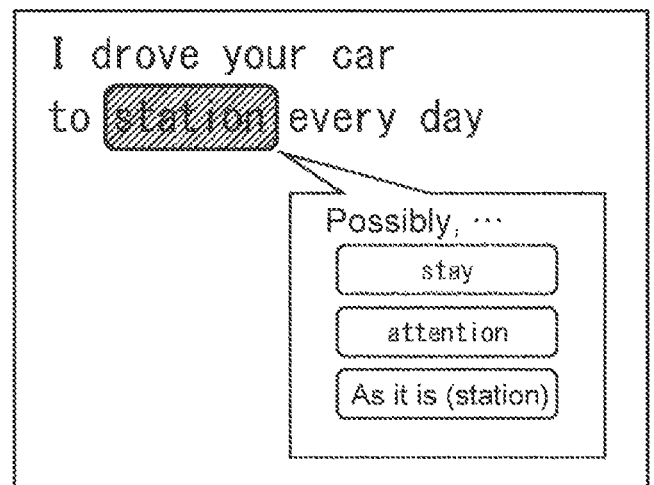
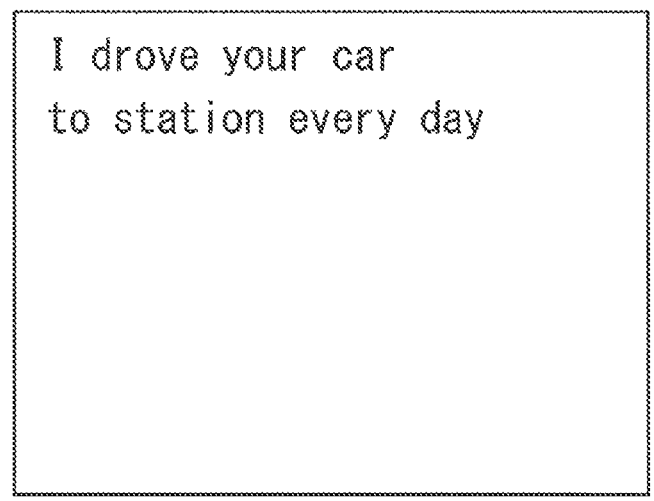
FIG.13

| Noun | Category |
|---|---|
| ... | ... |
| Apple | Fruit name |
| Mandarin orange | Fruit name |
| ... | ... |
| Station | Facilities name |
| ... | ... |

| Category | Information easily attached | Model |
|---|---|---|
| ... | ... | ... |
| Fruit name | Sweet | ①[Delicious fruit] + "is" + (target texts) |
| | | ②(Target texts) + "is very good for the body" |
| | | ... |
| Facilities name | Clean | ①"I am going at" + (target texts) + "which is popular spot for young people" |
| | | ... |

FIG.16

- Exchange of word
    Utterance: I drove your car to airport every day
    Recognition: I drove your car to airport every day
Repeated utterance: station

- Utilization of verb, and change of noun
    Utterance: I liked your car
    Recognition: I like your car
Repeated utterance: liked Utterance: I liked your car
    Recognition: I like your cars
Repeated utterance: car

- Error due to similar sound
    Utterance: She attacked me
    Recognition: He attacked me
Repeated utterance: She

- Recognition failure in units of phrase
    Utterance: I would like to go
    Recognition: I had to go
Repeated utterance: would like

FIG.18

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/000015 (filed on Jan. 4, 2018) under 35 U.S.C. § 371, which claims priority to Japanese Patent Application No. 2017-007122 (filed on Jan. 18, 2017), which are all hereby incorporated by reference in their entirety.

TECHNICAL FIELD

The present disclosure relates to an information processing apparatus, an information processing method, and a program, and in particular, to an information processing apparatus, an information processing method, and a program capable of providing a more convenient speech recognition service.

BACKGROUND ART

In recent years, utilization of user interface using speech input has been widespread, and it is important to implement speech recognition processing for enabling better speech input.

For example, Patent Literature 1 discloses a technique of replacing a word included in a speech-recognized sentence in a manner that depends on a language model based on the context in the sentence, thereby improving the accuracy of a sentence obtained as a speech recognition result.

CITATION LIST

Patent Literature

Patent Literature 1: JP-A-2016-110087

DISCLOSURE OF INVENTION

Technical Problem

However, since, in the technique disclosed in the aforementioned Patent Literature 1, a word is replaced in a manner that depends on past learning results and the like, it is difficult to replace a word as expected, in a case where appropriate learning has not been performed. For that reason, this may not contribute to improving the accuracy of the sentence obtained as the speech recognition result, thereby lowering convenience in the speech recognition service.

The present disclosure has been made in view of such a situation, and makes it possible to provide a more convenient speech recognition service.

Solution to Problem

An information processing apparatus according to one aspect of the present disclosure includes: a recognition unit that recognizes, as an edited portion, a desired word configuring a sentence presented to a user as a speech recognition result; a generating unit that acquires speech information repeatedly uttered for editing a word of the edited portion, and performs processing of connecting speech information other than a repeated utterance to the speech information, to generate speech information for speech recognition for editing; and a speech recognition unit that performs speech recognition on the speech information for speech recognition for editing generated by the generating unit.

An information processing method or a program according to one aspect of the present disclosure includes: steps of recognizing, as an edited portion, a desired word configuring a sentence presented to a user as a speech recognition result; acquiring speech information repeatedly uttered for editing a word of the edited portion and performing processing of connecting speech information other than a repeated utterance to the speech information, to generate speech information for speech recognition for editing; and performing speech recognition on the generated speech information for speech recognition for editing.

In one aspect of the present disclosure, the processing of recognizing, as an edited portion, a desired word configuring a sentence presented to a user as a speech recognition result, acquiring speech information repeatedly uttered for editing a word of the edited portion, and connecting speech information other than a repeated utterance to the speech information is performed, and speech information for speech recognition for editing is generated. Then, speech recognition is performed on the generated speech information for speech recognition for editing.

Advantageous Effects of Invention

In accordance with one aspect of the present disclosure, it is possible to provide a more convenient speech recognition service.

BRIEF DESCRIPTION OF DRAWINGS

FIG. 10 is a diagram for describing an example of speech recognition processing.

FIG. 11 is a diagram illustrating an example of a user interface for editing a speech recognition result.

FIG. 12 is a diagram for describing editing correspondence processing.

FIG. 13 is a diagram for describing display of a speech recognition result reflecting the editing.

FIG. 16 is a diagram illustrating an example of a database to be referred to for generation of speech information for speech recognition for editing.

FIG. 18 is a diagram for describing an example of performing a variety of edits based on a repeated utterance of a user.

MODE(S) FOR CARRYING OUT THE INVENTION

Hereinafter, with reference to the drawings, a specific embodiment to which the present technology is applied will be described in detail.

<Configuration Example of Speech Recognition System>

Figure 1:
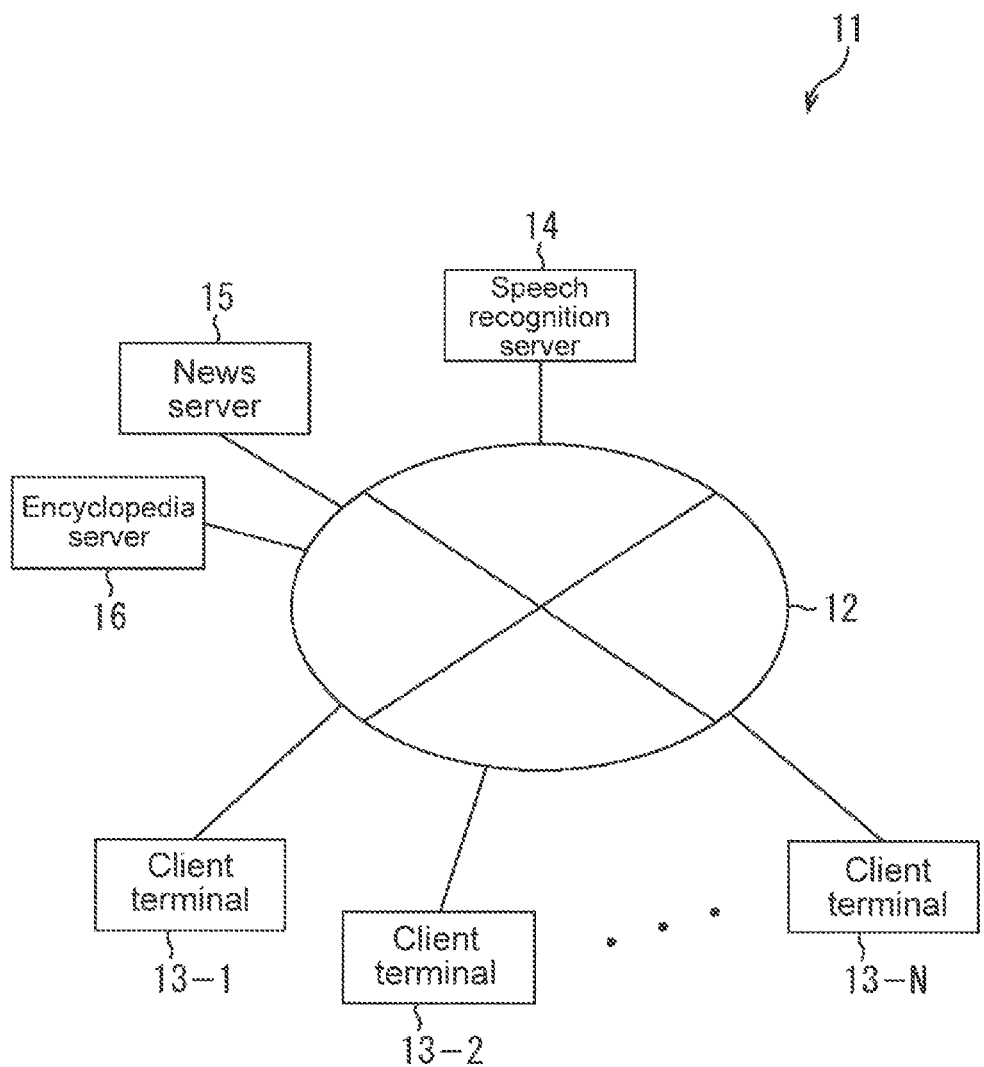
FIG. 1 is a block diagram illustrating a configuration example of an embodiment of a speech recognition system to which the present technology is applied.

FIG. 1 is a block diagram illustrating a configuration example of one embodiment of a speech recognition system to which the present technology is applied.

As illustrated in FIG. 1, in a speech recognition system 11, a plurality of client terminals 13-1 to 13-N (N in the example of FIG. 1) and a speech recognition server 14 are connected through a network 12 such as the Internet. Note that the client terminals 13-1 to 13-N are configured similarly, and hereinafter referred to as a client terminal 13 as appropriate, in a case where the client terminals need not to be mutually distinguishable.

Also, a news server 15 that provides information on general news and weather, and an encyclopedia server 16 that provides information on knowledge and explanation in various fields are also connected to the network 12. Note that, in the present embodiment described below, the information provided by the news server 15 and the encyclopedia server 16 is also referred to as fact information.

For example, in the speech recognition system 11, speech information based on an utterance of a user that owns each client terminal 13 is transmitted to the speech recognition server 14 through the network 12, and speech recognition processing is executed in the speech recognition server 14. Then, the speech recognition server 14 transmits a sentence (text information) including a string of words obtained as a speech recognition result, to the client terminal 13 of the user that has given the utterance, through the network 12. In this way, the client terminal 13 is able to display a speech recognition result for the utterance of the user and present the result to the user.

In the speech recognition system 11 having such a configuration, for example, since the latest high-performance speech recognition processing is implemented on the speech recognition server 14, it is possible to provide speech recognition processing for enabling better speech input, even though each client terminal 13 has poor processing performance.

Figure 2:
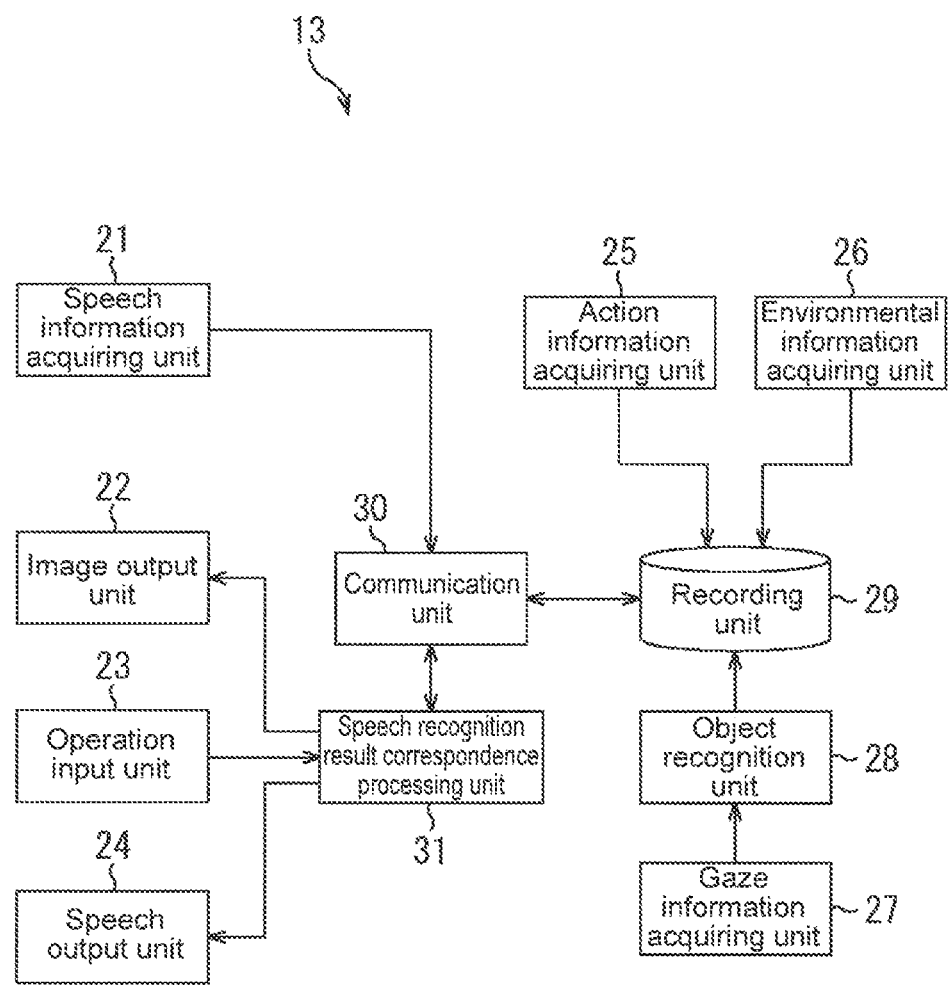
FIG. 2 is a block diagram illustrating a configuration example of a client terminal.

FIG. 2 is a block diagram illustrating a configuration example of the client terminal 13.

As shown in FIG. 2, the client terminal 13 includes a speech information acquiring unit 21, an image output unit 22, an operation input unit 23, a speech output unit 24, an action information acquiring unit 25, an environmental information acquiring unit 26, a gaze information acquiring unit 27, an object recognition unit 28, a recording unit 29, a communication unit 30, and a speech recognition result correspondence processing unit 31.

For example, the speech information acquiring unit 21 is configured with a microphone or the like for acquiring speech information, acquires speech information based on a speech that the user has uttered, and supplies the speech information to the communication unit 30. Then, the speech information is transmitted from the communication unit 30 to the speech recognition server 14 through the network 12 in FIG. 1.

For example, the image output unit 22 is configured with a display and the like for outputting an image, displays a speech recognition result for speech information based on the utterance of the user, and presents the result to the user. Also, for example, as described with reference to FIGS. 4 to 17, the image output unit 22 displays various kinds of user interfaces used in processing of correcting or editing the speech recognition result.

For example, the operation input unit 23 is configured with a touch panel for inputting a touch operation by the user on a display configuring the image output unit 22. Then, once the touch operation by the user is performed on the user interface displayed in the image output unit 22, the operation input unit 23 supplies operation information indicating a content of an operation input by the touch operation, to the speech recognition result correspondence processing unit 31.

For example, the speech output unit 24 is configured with a speaker or the like for outputting speech, and outputs a speech recognition result for speech information based on the utterance of the user by synthetic speech Text-to-Speech (TTS).

For example, the action information acquiring unit 25 is configured with a Global Positioning System (GPS) apparatus, an acceleration sensor, and the like, and periodically acquires position information and acceleration information and the like involved in the user's action as action information, to be sequentially supplied to the recording unit 29.

For example, the environmental information acquiring unit 26 is configured with a temperature sensor, a humidity sensor, and the like, and periodically acquires temperature, humidity, and the like representing the surrounding environment of the user as environmental information, to be sequentially supplied to the recording unit 29.

For example, the gaze information acquiring unit 27 is configured with an imaging apparatus capable of capturing a movement of the user's pupil, and acquires gaze information indicating a direction of the gaze of the user, to be supplied to the object recognition unit 28.

For example, the object recognition unit 28 is configured with an imaging apparatus capable of capturing the end of the gaze of the user, and specifies an object visually recognized by the user on the basis of the gaze information supplied from the gaze information acquiring unit 27, and performs object recognition processing on the specified object. Then, the object recognition unit 28 supplies object recognition information indicating a result obtained by recognizing the object, to the recording unit 29, along with the gaze information.

For example, the recording unit 29 is configured with a memory or a hard disk drive, and records action information supplied from the action information acquiring unit 25, environmental information supplied from the environmental information acquiring unit 26, and gaze information and object recognition information supplied from the object recognition unit 28.

The communication unit 30 is configured with a communication module for performing communication through the network 12, and transmits and receives various kinds of information to and from the speech recognition server 14. For example, the recording unit 29 transmits speech information supplied from the speech information acquiring unit 21 to the speech recognition server 14, receives a speech recognition result that has transmitted from the speech recognition server 14, and supplies the speech recognition result to the speech recognition result correspondence processing unit 31. Also, once information requesting collation information has been transmitted from the speech recognition server 14 as described later, the communication unit 30 reads out information corresponding to the request from among various kinds of information recorded in the recording unit 29 as the collation information, and transmits the corresponding information to the speech recognition server 14.

Once the speech recognition result transmitted from the speech recognition server 14 is supplied from the communication unit 30, the speech recognition result correspondence processing unit 31 supplies a sentence (text information) indicating the speech recognition result to the image output unit 22, to be displayed. Also, in a case where information for confirming a correction portion is added to the speech recognition result, the speech recognition result correspondence processing unit 31 generates a user interface for confirming the correction portion in accordance with the information, and displays the user interface on the image output unit 22, along with the speech recognition result. Then, once operation information corresponding to the touch operation by the user on the user interface for confirming the correction portion is supplied from the operation input unit 23, the speech recognition result correspondence processing unit 31 reflects correction on the speech recognition result in accordance with the operation information.

Also, once operation information for instructing to edit the speech recognition result displayed on the image output unit 22 is supplied from the operation input unit 23, the speech recognition result correspondence processing unit 31 specifies an object to be edited that has been instructed by the user. Then, the speech recognition result correspondence processing unit 31 transmits information indicating the object to be edited, to the speech recognition server 14 through the communication unit 30, and causes the image output unit 22 to display a user interface for urging a repeated utterance to delete and replace an edited portion specified as the object to be edited. Thereafter, the speech information of the repeated utterance acquired by the speech information acquiring unit 21 is transmitted to the speech recognition server 14, speech recognition is performed on the speech information of the repeated utterance, and replacement information for replacing the correction portion has been transmitted. In this way, the speech recognition result correspondence processing unit 31 supplies, to the image output unit 22, the speech recognition result on which the editing is reflected by replacing the correction portion with replacement information, and presents the speech recognition result to the user.

Figure 3:
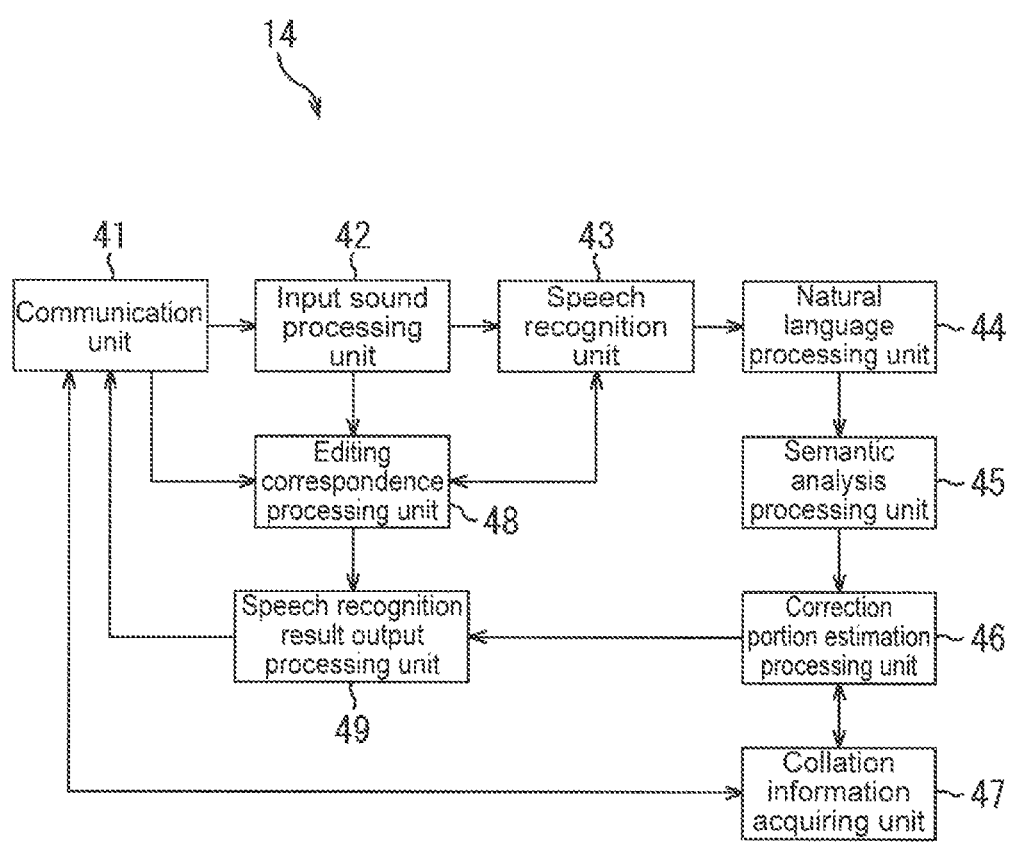
FIG. 3 is a block diagram illustrating a configuration example of a speech recognition server.

FIG. 3 is a block diagram illustrating a configuration example of the speech recognition server 14.

As shown in FIG. 3, the speech recognition server 14 includes a communication unit 41, an input sound processing unit 42, a speech recognition unit 43, a natural language processing unit 44, a semantic analysis processing unit 45, a correction portion estimation processing unit 46, a collation information acquiring unit 47, an editing correspondence processing unit 48, and a speech recognition result output processing unit 49.

The communication unit 41 is configured with a communication module for performing communication through the network 12, and transmits and receives various kinds of information to and from the client terminal 13. For example, the communication unit 41 receives the speech information that has been transmitted from the client terminal 13 and supplies the speech information to the input sound processing unit 42, and transmits the speech recognition result information supplied from the speech recognition result output processing unit 49 to the client terminal 13.

The input sound processing unit 42 performs various kinds of preprocessing required for the speech information supplied from the communication unit 41, before speech recognition in the speech recognition unit 43 is performed on the speech information. For example, the input sound processing unit 42 excludes a section being silent and a section including only noise from the sound information, performs Voice Activity Detection (VAD) processing of detecting an utterance section including the uttered speech from the speech information, and supplies the speech information in the utterance section to the speech recognition unit 43.

The speech recognition unit 43 performs speech recognition on the speech information supplied from the input sound processing unit 42, recognizes the utterance of the user based on the speech information for each word, and supplies a sentence including a string of words as a speech recognition result to the natural language processing unit 44.

The natural language processing unit 44 performs natural language processing (morpheme analysis, syntactic analysis, and the like) on a sentence representing the speech recognition result supplied from the speech recognition unit 43, to be recognized as a natural language routinely used by humans, and supplies the speech recognition result subjected to natural language processing, to the semantic analysis processing unit 45. For example, the natural language processing unit 44 is able to specify the part of speech for each word configuring a sentence by performing natural language processing.

For a sentence representing the speech recognition result subjected to natural language processing in the natural language processing unit 44, the semantic analysis processing unit 45 performs semantic analysis processing of analyzing the meaning of the sentence and supplies a content (semantic analysis result) of the sentence indicated by the speech recognition result, to the correction portion estimation processing unit 46.

Based on the accuracy of the content of the sentence indicated by the speech recognition result supplied from the semantic analysis processing unit 45, the correction portion estimation processing unit 46 performs processing of estimating a correction portion that needs to be corrected for the sentence. At this time, the correction portion estimation processing unit 46 acquires the collation information required for determining the accuracy of the content of the sentence indicated by the speech recognition result, through the collation information acquiring unit 47. For example, it is possible to use fact information including various kinds of data such as action data, weather data, and statistical data, as the collation information. That is, as described above, it is possible to use action information, environmental information, gaze information, object recognition information, and the like recorded in the client terminal 13, as the collation information. Also, in addition to using news articles and weather information, and the like provided by the news server 15, and various kinds of articles provided by the encyclopedia server 16 as the collation information, for example, it is possible to use various kinds of fact information confirmed as facts such as "The number of visitors at the XX theme park the day before is one million", "The average speed is 15 km/h in the traffic jam on the XX highway the day before", as the collation information. Then, as described later with reference to FIGS. 4 to 9, the correction portion estimation processing unit 46 collates the content of the sentence indicated by the speech recognition result with the collation information, and in a case where it is estimated that there is a correction portion that needs to be corrected, the correction portion estimation processing unit 46 notifies the speech recognition result output processing unit 49 of the correction portion.

The collation information acquiring unit 47 transmits the information requesting the collation information required by the correction portion estimation processing unit 46, through the communication unit 41, acquires the collation information that has been transmitted in response to a request, and supplies the collation information to the correction portion estimation processing unit 46. For example, in a case where the collation information required by the correction portion estimation processing unit 46 is the action information of the user, the collation information acquiring unit 47 requests the client terminal 13 for the action information of the user. Also, in a case where the collation information required by the correction portion estimation processing unit 46 is the weather information, the collation information acquiring unit 47 requests the news server 15 for weather information.

As described later with reference to FIGS. 10 to 13, the editing correspondence processing unit 48 deletes the phoneme information of a word specified as an object to be edited, from the speech information of the maintained speech recognition result, and connects the speech information of the repeated utterance to an edited portion that has been deleted to generate speech information for speech recognition for editing. Then, the editing correspondence processing unit 48 acquires a word indicated by the speech information of the repeated utterance as replacement information, by supplying the speech information for speech recognition for editing to the speech recognition unit 43 and causing the speech recognition unit 43 to perform speech recognition, and supplies the replacement information to the speech recognition result output processing unit 49.

In a case where a correction portion that needs to be corrected for the sentence indicated by the speech recognition result is estimated by the correction portion estimation processing unit 46, the speech recognition result output processing unit 49 adds information for confirming the estimated correction portion to the speech recognition result, and transmits the information-added speech recognition result to the client terminal 13 through the communication unit 41. Note that, in a case where the correction portion that needs to be corrected for the sentence indicated by the speech recognition result is not estimated by the correction portion estimation processing unit 46, the speech recognition result output processing unit 49 transmits only the speech recognition result to the client terminal 13.

Also, once the replacement information is supplied from the editing correspondence processing unit 48, the speech recognition result output processing unit 49 transmits the replacement information, to the client terminal 13 through the communication unit 41. Furthermore, in a case of transmitting a synthetic speech as the speech recognition result, the speech recognition result output processing unit 49 is able to generate the synthetic speech by reciting the sentence indicated by the speech recognition result, to be transmitted.

In the speech recognition system 11 including the client terminal 13 and the speech recognition server 14 configured as described above, the speech recognition server 14 is able to collate a content of the sentence obtained as the speech recognition result with collation information required for determining the accuracy of the content, and estimate a correction portion that needs to be corrected for the sentence. Here, the fact information provided by the news server 15 and the encyclopedia server 16, the action information of the user recorded in the client terminal 13, and the like are used as collation information.

Then, the speech recognition server 14 transmits the information for confirming the correction portion to the client terminal 13, along with the speech recognition result. In response to this, the client terminal 13 displays the user interface for confirming the correction portion estimated in the speech recognition server 14, and once an operation for instructing to correct the correction portion is performed by the user, it is possible to reflect correction on the speech recognition result.

Furthermore, in the speech recognition system 11, the client terminal 13 is able to specify an object to be edited, once an operation for instructing to edit the sentence of the speech recognition result is performed by the user. Then, the client terminal 13 transmits the speech information of the repeated utterance to the speech recognition server 14. In response to this, the speech recognition server 14 deletes an edited portion to be edited from the maintained speech information, performs speech recognition after connecting the speech information of the repeated utterance to the edited portion, and transmits the speech recognition result reflecting the editing to the client terminal 13.

In this way, the client terminal 13 is able to display the speech recognition result reflecting the editing, to be presented to the user. Note that, in the speech recognition system 11, for example, when the correction portion estimated by the speech recognition server 14 is corrected, the correction portion may be specified as an object to be edited, and the correction portion is able to be corrected (edited) in accordance with the speech information of the repeated utterance to correct the correction portion.

In this way, in the speech recognition system 11, since the correction portion is estimated for the sentence of the speech recognition result, or the editing by the user is reflected, it is possible to easily correct or edit a sentence obtained as the speech recognition result. In this way, the speech recognition system 11 is able to provide a more convenient speech recognition service.

<Example of User Interface for Presenting Correction Portion>

With reference to FIGS. 4 to 9, a user interface for presenting a correction portion estimated for a sentence obtained as a speech recognition result will be described.

Figure 4:
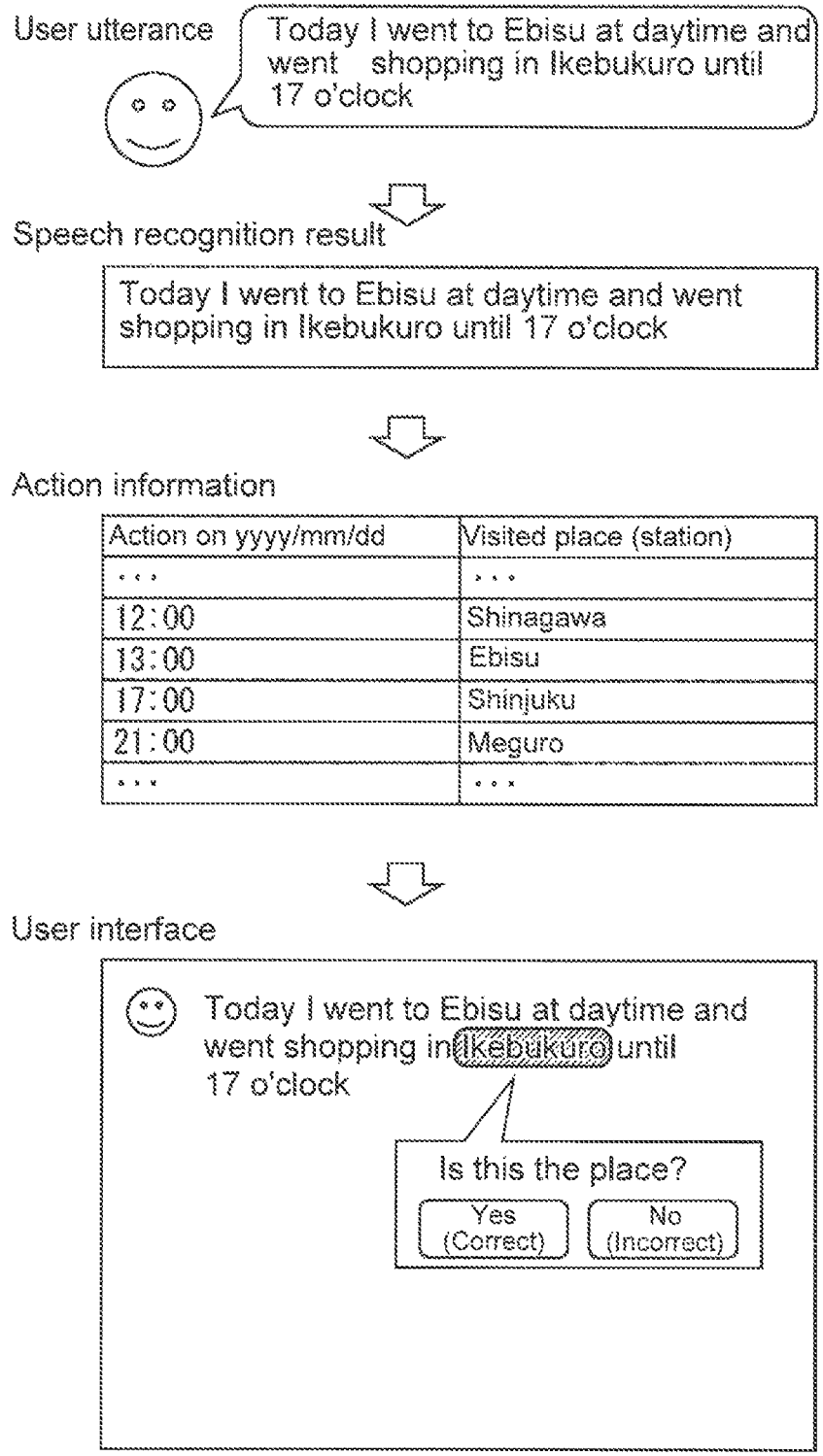
FIG. 4 is a diagram illustrating a first example of a user interface for presenting a correction portion estimated on the basis of action information.

FIG. 4 illustrates a first example of a user interface for presenting a correction portion estimated on the basis of action information for a sentence obtained as a speech recognition result. For example, in a case where a day's action such as before going to bed is ended, it is considered that the user gives an utterance of "TODAY I WENT TO EBISU AT DAYTIME AND WENT SHOPPING IN IKEBUKURO UNTIL 17 O'CLOCK", to the client terminal 13, when generating a message indicating an event on that day.

First, in the client terminal 13, the speech information acquiring unit 21 acquires speech information based on the utterance of the user, and the communication unit 30 transmits the speech information to the speech recognition server 14.

Then, in the speech recognition server 14, the speech recognition unit 43 performs speech recognition on the speech information, thereby acquiring the speech recognition result of "TODAY I WENT TO EBISU AT DAYTIME AND WENT SHOPPING IN IKEBUKURO UNTIL 17 O'CLOCK". Then, the correction portion estimation processing unit 46 recognizes that the action information of the user is required as collation information for determining the accuracy of the content (time period and place) of the sentence indicated by such a speech recognition result. In response to this, the collation information acquiring unit 47 transmits information requesting the action information of the user in the time period based on the sentence indicated by the speech recognition result as the collation information, to the client terminal 13.

In accordance with the information requesting such action information of the user as collation information, in the client terminal 13, the communication unit 30 reads out information corresponding to the request from among the various kinds of information recorded in the recording unit 29, and transmits the corresponding information as collation information, to the speech recognition server 14.

In response to this, in the speech recognition server 14, the collation information acquiring unit 47 acquires the action information transmitted from the client terminal 13, and supplies the action information to the correction portion estimation processing unit 46. The correction portion estimation processing unit 46 collates the content of the sentence indicated by the speech recognition result with the action information of the user and estimates whether or not there is a correction portion that needs to be corrected for the sentence. For example, in a case where a place in the time period indicated by the speech recognition result does not match a place indicated in the action information in the time period, the correction portion estimation processing unit 46 is able to estimate the place indicated by the speech recognition result as the correction portion.

In the example illustrated in FIG. 4, the correction portion estimation processing unit 46 collates the place of "EBISU" in the time period of "DAYTIME" indicated by the speech recognition result with the place indicated in the action information in the time period. Similarly, the correction portion estimation processing unit 46 collates the place of "IKEBUKURO" in the time period of "17 O'CLOCK" indicated by the speech recognition result with the place indicated in the action information in the time period. As a result, since the place of "IKEBUKURO" in the time period of "17 O'CLOCK" indicated by the speech recognition result does not match the place of "SHINJUKU" indicated in the action information in the time period, the correction portion estimation processing unit 46 estimates "IKEBUKURO" indicated by the speech recognition result as a correction portion.

Based on this, the correction portion estimation processing unit 46 adds information for confirming the correction portion to the speech recognition result, and transmits the information-added speech recognition result to the client terminal 13. Therefore, in the client terminal 13, it is possible to display a user interface for confirming a word estimated as the correction portion, along with the sentence indicating the speech recognition result, in accordance with the information for confirming the correction portion.

In the example illustrated in FIG. 4, a user interface of "IS THIS THE PLACE?" for confirming whether or not the place is correct is displayed for the place of "IKEBUKURO" estimated as a correction portion. Also, in the user interface, a GUI (YES button/NO button) for inputting the confirmation result by the user is displayed. Note that it is possible to emphasize a text of the place of "IKEBUKURO" estimated as the correction portion, display the text by changing a color or size, or display the text with blinking. Also, the synthetic speech of "IS THIS THE PLACE?" may be output.

In a case where the user thinks that the place of "IKEBUKURO" indicated by the speech recognition result is correct with respect to such a user interface, the user performs a touch operation on the YES button. In this way, the place of "IKEBUKURO" indicated by the speech recognition result is determined. On the other hand, in a case where the user thinks that the place of "IKEBUKURO" indicated by the speech recognition result is incorrect with respect to such a user interface, the user performs a touch operation on the NO button. In this way, the user is able to easily correct the place of "IKEBUKURO" indicated by the speech recognition result. For example, in this case, it is possible to perform processing of deleting the correction portion, displaying a user interface for urging the user to give a repeated utterance, and replacing the correction portion on the basis of the speech information of the repeated utterance.

Figure 5:
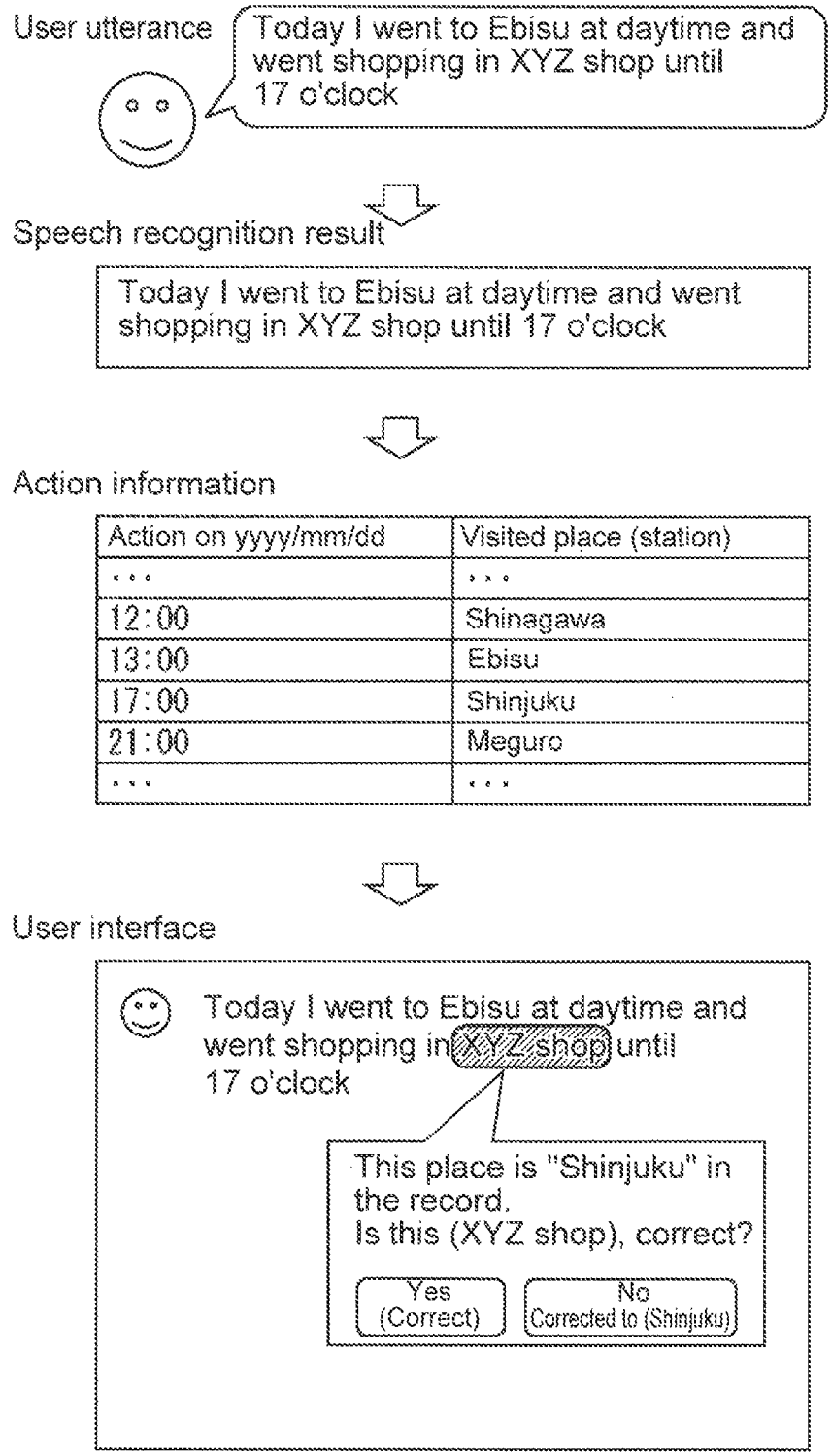
FIG. 5 is a diagram illustrating a second example of a user interface for presenting a correction portion estimated on the basis of action information.

Next, FIG. 5 illustrates a second example of a user interface for presenting a correction portion estimated on the basis of action information for a sentence obtained as a speech recognition result. For example, in a case where a day's action such as before going to bed is ended, it is considered that the user gives an utterance of "TODAY I WENT TO EBISU AT DAYTIME AND WENT SHOPPING IN XYZ SHOP UNTIL 17 O'CLOCK", to the client terminal 13, when generating a message indicating an event on that day.

Similarly as described with reference to FIG. 4, the correction portion estimation processing unit 46 requests action information of the user, as collation information for determining the accuracy of the content (time period and place) of the sentence indicated by the speech recognition result, and collates the content of the sentence indicated by the speech recognition result with the action information of the user. As a result, since, in the example illustrated in FIG. 5, the place of "XYZ SHOP" in the time period of "17 O'CLOCK" indicated by the speech recognition result does not match the place of "SHINJUKU" indicated in the action information in the time period, the correction portion estimation processing unit 46 estimates the place of "XYZ SHOP" indicated by the speech recognition result as a correction portion.

Based on this, for the user interface for confirming whether or not the place is correct for the place of "XYZ SHOP" estimated as the correction portion, this place is "SHINJUKU" in the record. "IS THIS (XYZ SHOP), CORRECT?" is displayed. Also, in the user interface, a GUI (YES button/NO button) for inputting the confirmation result by the user is displayed.

In a case where the user thinks that the place of "XYZ shop" indicated by the speech recognition result is correct with respect to such a user interface, the user performs a touch operation on the YES button. In this way, the place of "XYZ SHOP" indicated by the speech recognition result is determined. On the other hand, in a case where the user thinks that the place of "XYZ SHOP" indicated by the speech recognition result is incorrect with respect to such a user interface, the user performs a touch operation on the NO button. In this case, the place of "XYZ SHOP" indicated by the speech recognition result is corrected to "SHIN-JUKU".

As described with reference to FIGS. 4 and 5, in a case where there is a difference between the granularity of the information recorded in the client terminal 13 and the granularity of the information in the sentence indicating the speech recognition result, the speech recognition system 11 is able to estimate this information as a correction portion and present the information, along with the speech recognition result.

Figure 6:
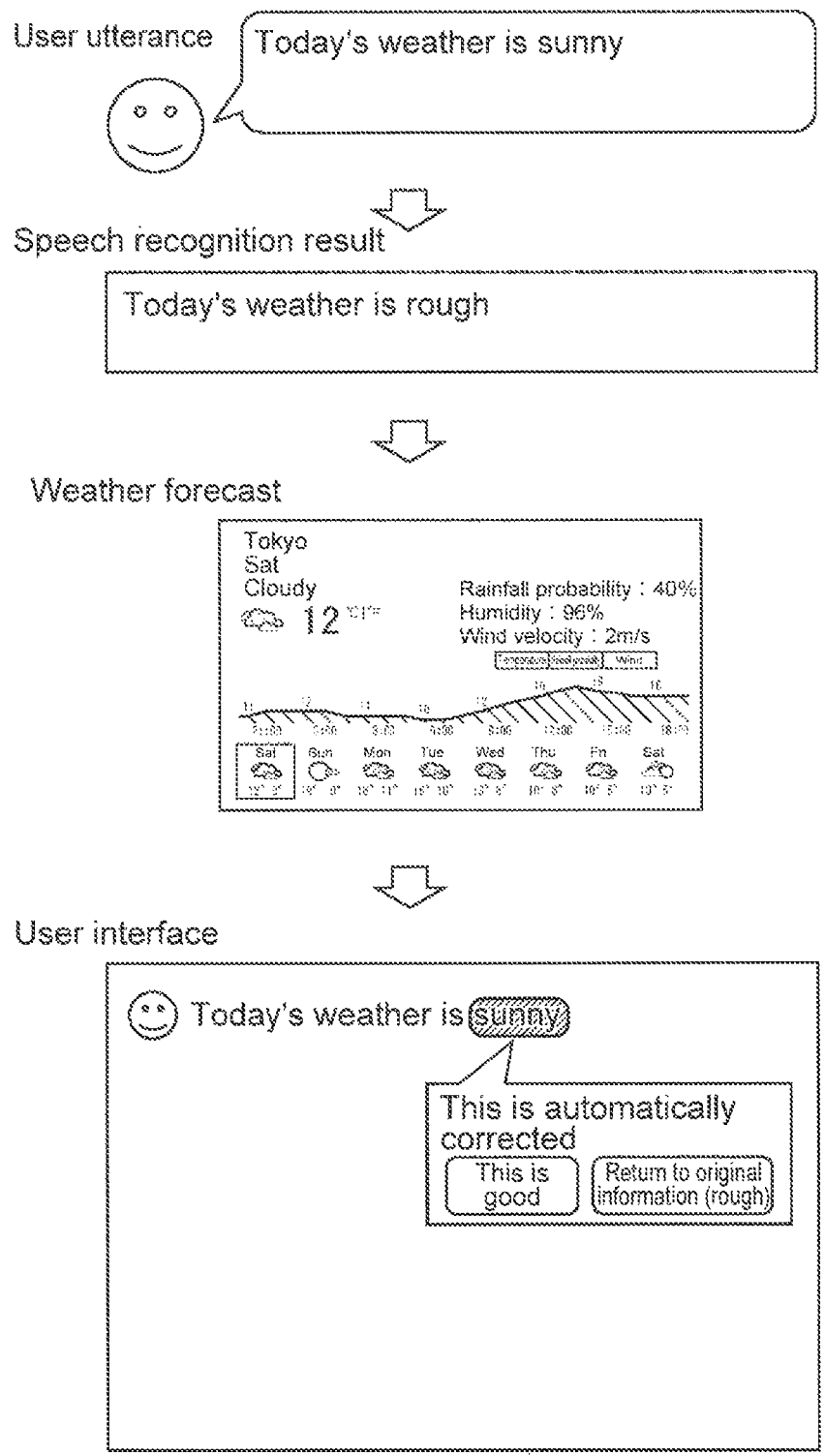
FIG. 6 is a diagram illustrating a first example of a user interface for presenting a correction portion estimated on the basis of weather information.

Next, FIG. 6 illustrates a first example of a user interface for presenting a correction portion estimated on the basis of weather information for a sentence obtained as a speech recognition result. For example, in a case where a day's action is ended, such as before going to bed, it is considered that the user gives an utterance of "TODAY'S WEATHER IS SUNNY", to the client terminal 13, when generating a message indicating an event on that day.

First, in the client terminal 13, the speech information acquiring unit 21 acquires speech information based on the utterance of the user, and the communication unit 30 transmits the speech information to the speech recognition server 14.

Then, in the speech recognition server 14, the speech recognition unit 43 performs speech recognition on the speech information, and acquires the speech recognition result of "TODAY'S WEATHER IS ROUGH" (because the pronunciations therebetween are similar, speech recognition is incorrectly acquired). In this way, the correction portion estimation processing unit 46 recognizes that the weather information of the day is required as collation information for determining whether or not the content (weather) of the sentence indicated by such a speech recognition result is correct. Therefore, the collation information acquiring unit 47 requests the news server 15 to transmit the weather information of the day.

Thereafter, in the speech recognition server 14, the collation information acquiring unit 47 acquires the weather information transmitted from the news server 15, and supplies the weather information to the correction portion estimation processing unit 46. As a result of collating the content of the sentence indicated by the speech recognition result with the weather information, the correction portion estimation processing unit 46 estimates a portion that needs to be corrected for the sentence. For example, the correction portion estimation processing unit 46 is able to estimate the weather of the speech recognition result which does not match the weather information, as a correction portion.

In the example illustrated in FIG. 6, the correction portion estimation processing unit 46 collates the weather of "ROUGH" of the speech recognition result with the weather information. Then, once it is recognized that the weather of the day in accordance with the weather information is not "ROUGH", the correction portion estimation processing unit 46 is able to estimate the weather of "ROUGH" of the speech recognition result as a correction portion.

Based on this, the correction portion estimation processing unit 46 adds information for confirming the correction portion to the speech recognition result, and transmits the information-added speech recognition result to the client terminal 13. Therefore, in the client terminal 13, it is possible to display a user interface for confirming a word estimated as the correction portion, along with the sentence indicating the speech recognition result, in accordance with the information for confirming the correction portion.

In the example illustrated in FIG. 6, the weather of "ROUGH" estimated as the correction portion in the speech recognition result is automatically corrected to the weather of "SUNNY", and a user interface of "THIS IS AUTOMATICALLY CORRECTED" for confirming whether or not the correction is correct is displayed. Also, in the user interface, a GUI (a button of THIS IS GOOD/a button of RETURN TO ORIGINAL INFORMATION (ROUGH)) for inputting the confirmation result by the user is displayed.

In a case where the user thinks that the weather of "SUNNY" indicated by the automatically corrected speech recognition result is correct with respect to such a user interface, the user performs a touch operation on the button of THIS IS GOOD. In this way, the weather of "SUNNY" indicated by the speech recognition result is determined. On the other hand, in a case where the user thinks that the weather of "SUNNY" indicated by the automatically corrected speech recognition result is incorrect with respect to such a user interface, the user performs a touch operation on the button of RETURN TO ORIGINAL INFORMATION (ROUGH). In this case, the weather of "SUNNY" indicated by the automatically corrected speech recognition result is corrected to "ROUGH".

Figure 7:
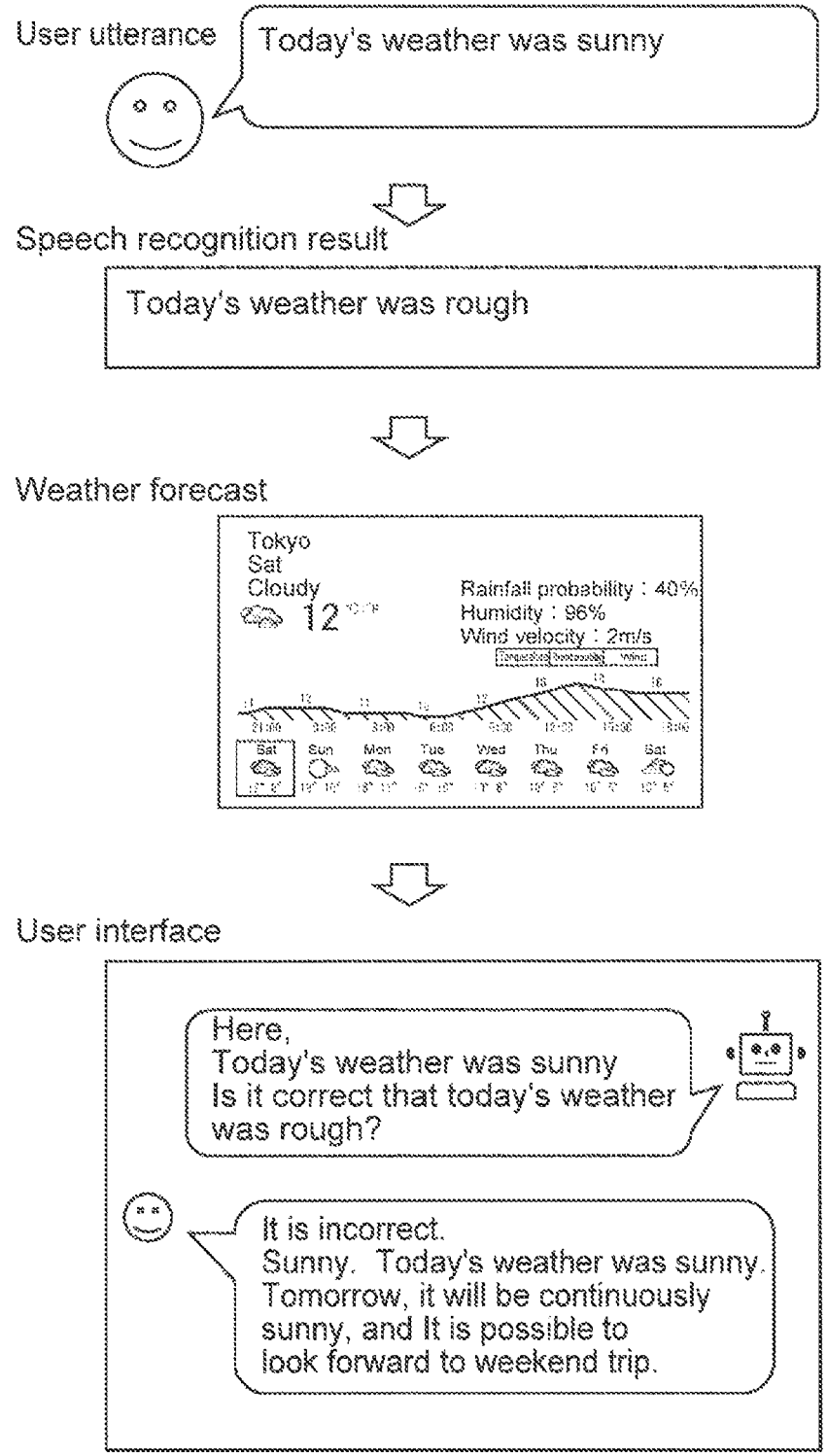
FIG. 7 is a diagram illustrating a second example of a user interface for presenting a correction portion estimated on the basis of weather information.

Next, FIG. 7 illustrates a second example of a user interface for presenting a correction portion estimated on the basis of weather information for a sentence obtained as a speech recognition result. For example, it is considered that the user gives an utterance of "TODAY'S WEATHER WAS SUNNY" to the client terminal 13, when talking with a virtual agent using a speech recognition function provided by the speech recognition system 11.

In response to this, similarly, as described with reference to FIG. 6, since the weather information is not "ROUGH", the correction portion estimation processing unit 46 estimates the weather of "ROUGH" of the speech recognition result as a correction portion.

Then, in the example illustrated in FIG. 7, the agent's response to the utterance of the user of "TODAY'S WEATHER WAS SUNNY" is displayed as "HERE, TODAY'S WEATHER WAS SUNNY/IS IT CORRECT THAT TODAY'S WEATHER WAS SUNNY?", thereby notifying the information to be corrected. Corresponding to such an agent's response, the user is able to talk with the agent by replying on the basis of the own recognition. Then, by repeating a talk with such an agent for a plurality of turns, the user is able to reduce a stress.

As described with reference to FIGS. 6 and 7, in a case where the accuracy of information is low, resulting from collating information in the sentence indicating the speech recognition result with fact information such as weather information, the speech recognition system 11 is able to estimate the information as a correction portion and automatically correct the speech recognition result to be presented.

Next, with reference to FIGS. 8 and 9, there will be described a case where an object located at the end of the gaze of the user is recognized and corrected automatically, when translation is performed using the speech recognition function provided by the speech recognition system 11.

Figure 8:
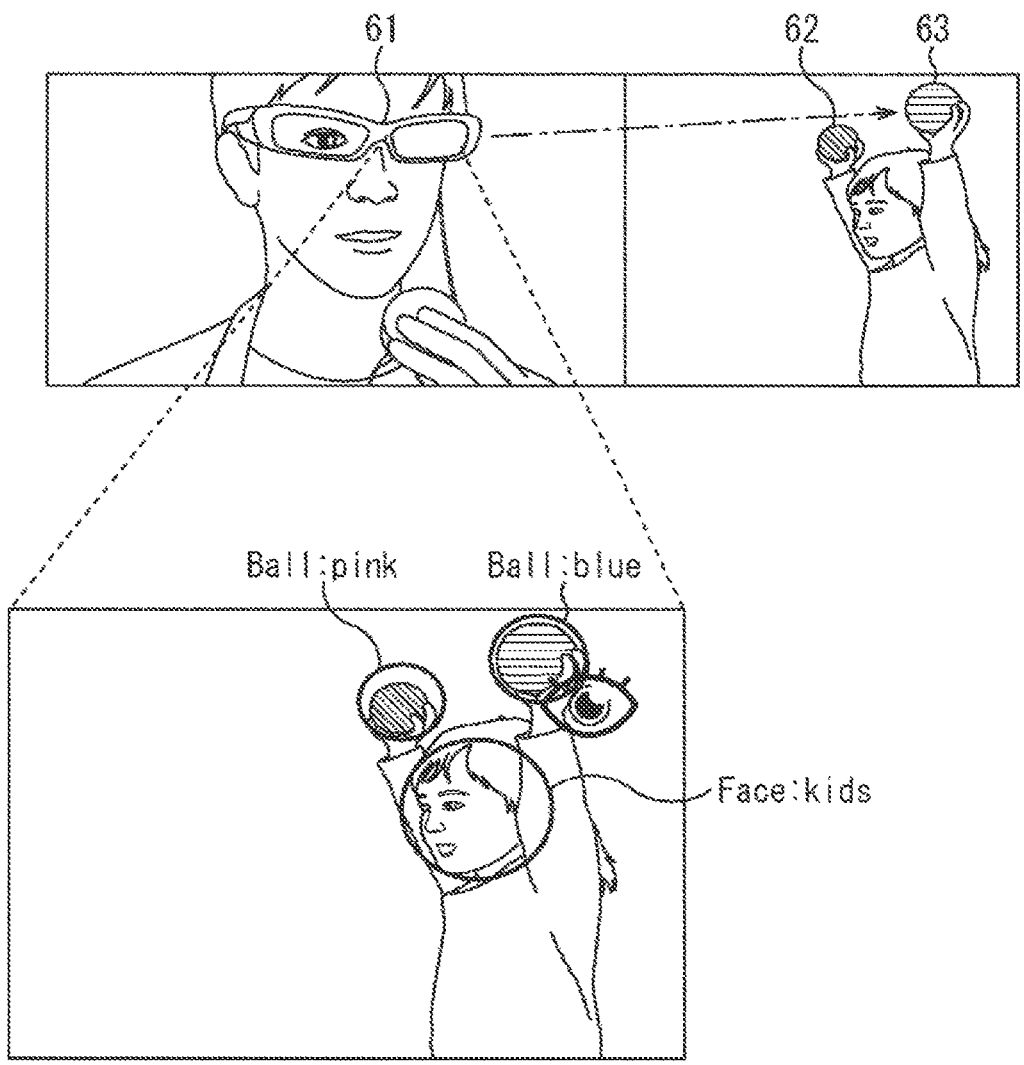
FIG. 8 is a diagram for describing recognition of an object located at the end of a gaze of a user.

For example, as illustrated in FIG. 8, the user wears wearable goggles 61 incorporating the gaze information acquiring unit 27 and the object recognition unit 28 in FIG. 2. Then, the gaze information acquiring unit 27 recognizes the gaze of the user as indicated by the arrow of a dashed line in FIG. 8, and the object recognition unit 28 is capable of performing object recognition on an object visually recognized by the user.

In the example illustrated in FIG. 8, there is illustrated a state where a kid has a pink ball 62 and a blue ball 63 in both hands, and the gaze of the user is heading toward the blue ball 63. Therefore, the object recognition unit 28 superimposes a user interface (pupil mark) indicating a result obtained by recognizing the gaze of the user on the blue ball, and it is also indicated that the object recognition result is a blue ball (Ball: Blue).

Figure 9:
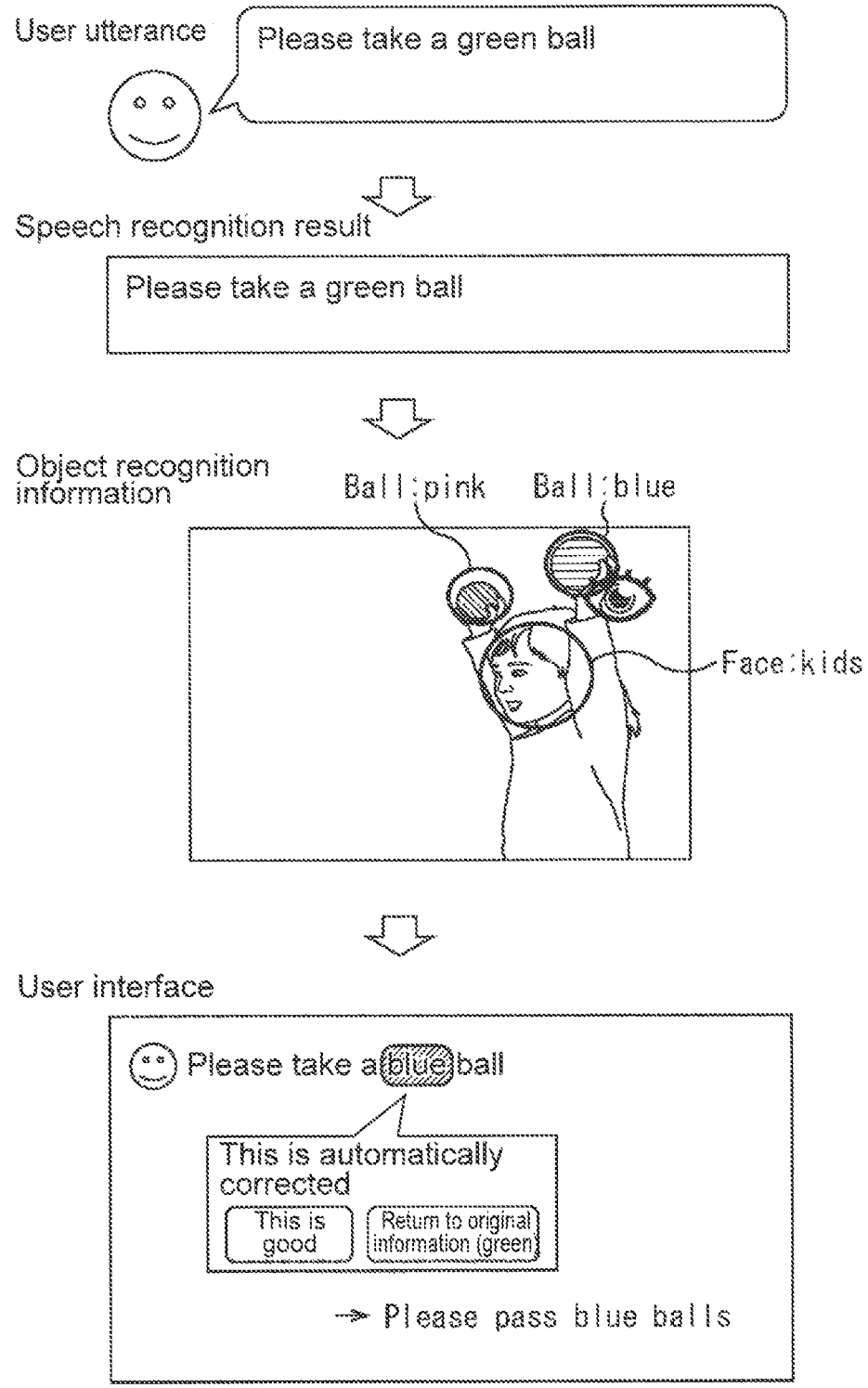
FIG. 9 is a diagram illustrating an example of a user interface for presenting a correction portion estimated on the basis of object recognition information.

In such a situation, as illustrated in FIG. 9, it is considered that the user gives an utterance of "PLEASE TAKE A GREEN BALL" to the client terminal 13.

First, in the client terminal 13, the speech information acquiring unit 21 acquires speech information based on the utterance of the user, and the communication unit 30 transmits the speech information to the speech recognition server 14.

Then, in the speech recognition server 14, the speech recognition unit 43 performs speech recognition on the speech information, thereby acquiring the speech recognition result of "PLEASE TAKE A GREEN BALL". Then, the correction portion estimation processing unit 46 recognizes that the object recognition information is required as collation information for determining the accuracy of the content (object) of the sentence indicated by such a speech recognition result. In response to this, the collation information acquiring unit 47 transmits information requesting the object recognition information when the utterance of the user is performed, as the collation information, to the client terminal 13.

In accordance with the information requesting such object recognition information as collation information, in the client terminal 13, the communication unit 30 reads out information corresponding to the request from among the various kinds of information recorded in the recording unit 29 and transmits the corresponding information as collation information to the speech recognition server 14.

In response to this, in the speech recognition server 14, the collation information acquiring unit 47 acquires the object recognition information transmitted from the client terminal 13, and supplies the object recognition information to the correction portion estimation processing unit 46. The correction portion estimation processing unit 46 collates the content of the sentence indicated by the speech recognition result with the object recognition information, and estimates whether or not there is a correction portion that needs to be corrected for the sentence. For example, in a case where an object indicated by the speech recognition result does not match an object indicated in the object recognition information, the correction portion estimation processing unit 46 is able to estimate the object indicated by the speech recognition result as a correction portion.

In the example illustrated in FIG. 9, the correction portion estimation processing unit 46 collates the object of "GREEN BALL" indicated by the speech recognition result with the object recognition information of "BLUE BALL (Ball: Blue)" as described with reference to FIG. 8. As a result, since the object of "GREEN BALL" indicated by the speech recognition result does not match the object recognition information of "BLUE BALL (Ball: Blue)", the correction portion estimation processing unit 46 estimates the object of "GREEN BALL" indicated by the speech recognition result as a correction portion.

Based on this, the correction portion estimation processing unit 46 adds information for confirming the correction portion to the speech recognition result, and transmits the information-added speech recognition result to the client terminal 13. Therefore, in the client terminal 13, it is possible to display a user interface for confirming a word estimated as the correction portion, along with the sentence indicating the speech recognition result, in accordance with the information for confirming the correction portion.

In the example illustrated in FIG. 9, the color "GREEN" of the object estimated as the correction portion in the speech recognition result is automatically corrected to the color "BLUE" of the object, and a user interface of "THIS IS AUTOMATICALLY CORRECTED" for confirming whether or not the correction is correct is displayed. Also, in the user interface, a GUI (a button of THIS IS GOOD/a button of RETURN TO ORIGINAL INFORMATION (GREEN)) for inputting the confirmation result by the user is displayed. Furthermore, the translation result of "Please pass blue balls" obtained by performing translation using the speech recognition result is displayed.

In a case where the user thinks that the color "BLUE" of the object indicated by the automatically corrected speech recognition result is correct with respect to such a user interface, the user performs a touch operation on the button of THIS IS GOOD. In this way, the color "BLUE" of the object indicated by the speech recognition result is determined. On the other hand, in a case where the user thinks that the color "BLUE" of the object indicated by the automatically corrected speech recognition result is incorrect with respect to such a user interface, the user performs a touch operation on the button of RETURN TO ORIGINAL INFORMATION (GREEN). In this case, the color "BLUE" of the object indicated by the automatically corrected speech recognition result is corrected to "GREEN".

As described with reference to FIGS. 8 and 9, in a case where the accuracy of information is low, resulting from collating information in the sentence indicating the speech recognition result with object recognition information recorded in the client terminal 13, the speech recognition system 11 is able to estimate the information as a correction portion and automatically correct the speech recognition result to be presented.

<Example of User Interface for Accepting Editing of Speech Recognition Result>

With reference to FIGS. 10 to 13, a user interface for editing a speech recognition result based on the speech recognition processing by the speech recognition system 11 will be described.

For example, as illustrated in FIG. 10, in accordance with the utterance of a user of "I drove your car to airport every day", in the client terminal 13, the speech information acquiring unit 21 acquires the speech information of a waveform as illustrated. Then, in the speech recognition server 14, the speech recognition unit 43 executes speech recognition processing on the basis of the speech information, acquires a sentence (text information) including a string of words recognized as the speech recognition result, and specifies a correspondence relationship between each word and phoneme information obtained from the speech information. Furthermore, in the speech recognition server 14, the natural language processing unit 44 specifies the part of speech for each word of the speech recognition result and acquires information of the part of speech. Here, in the speech recognition server 14, the speech information, the correspondence relationship between a word and phoneme information, and the information of the part of speech are temporarily maintained.

Then, in a case where, as a result of the correction portion estimation processing unit 46 performing estimation of the correction portion as described above, there is no correction portion, the speech recognition result of "I drove your car to airport every day" is displayed on the image output unit 22 of the client terminal 13.

By the way, even though the utterance of the user matches the speech recognition result, the user may desire to edit the content of the utterance.

For example, as illustrated in FIG. 11, in a case where the user desires to edit a word of "airport" displayed on the image output unit 22 to a word of "station", the user touches and holds a portion where the word of "airport" desired to be edited is displayed. In response to this, the operation input unit 23 supplies operation information indicating the content of the operation to the speech recognition result correspondence processing unit 31, and the speech recognition result correspondence processing unit 31 specifies the word of "airport" displayed on the image output unit 22 as an object to be edited. Then, the speech recognition result correspondence processing unit 31 is able to display a user interface for editing the speech recognition result.

In the example illustrated in FIG. 11, a user interface of "DO YOU WANT TO DELETE?" for confirming the deletion of the word is displayed for the word of "airport" specified as an object to be edited. Also, in the user interface, a GUI (OK button/NG button) for inputting the confirmation result by the user is displayed.

In a case where the user agrees to delete the word of "airport" specified as an object to be edited with respect to such a user interface, the user performs a touch operation on the OK button. In response to this, the speech recognition result correspondence processing unit 31 transmits information indicating deletion of the word of "airport" specified as the object to be edited, to the speech recognition server 14.

In response to this, in the speech recognition server 14, the editing correspondence processing unit 48 extracts phoneme information associated with the word of "airport" from the speech information based on the utterance of the user of "I drove your car to airport every day". Therefore, as illustrated in FIG. 11, the speech information maintained in the speech recognition server 14 is configured with only phoneme information corresponding to words (hereinafter, referred to as speech information other than the object to be edited, as appropriate) other than the word to be edited.

Note that, in addition to the example illustrated in FIG. 11, for example, a word to be edited may be specified in accordance with the utterance of the user of "DELETE AIRPORT, AND ADD STATION". Also, for example, in a case where the user fixes his/her gaze on a word desired to be edited for a predetermined time (for example, 3 seconds) or more, the word may be specified as an object to be edited. Also in these cases, it is possible to display the same user interface as that in FIG. 11 and delete a word to be edited, in accordance with the touch operation by the user on the user interface.

On the other hand, as illustrated in FIG. 12, in the client terminal 13, the speech recognition result correspondence processing unit 31 displays the user interface for urging the repeated utterance on the image output unit 22. In this user interface, there is displayed a string of words in which a portion, where a word to be edited is deleted from the speech recognition result, becomes blank, and a message of "WAITING FOR A REPEATED UTTERANCE" urging a repeated utterance in order to edit a word in the blank portion.

Corresponding to such a user interface, the speech information acquiring unit 21 acquires the speech information of the repeated utterance based on the utterance of the user of the "station", and transmits the speech information of the repeated utterance to the speech recognition server 14. In the speech recognition server 14, the editing correspondence processing unit 48 performs processing of connecting the speech information of "station" of the repeated utterance to a portion where the phoneme information associated with the word of "airport" is deleted, in the speech information other than the object to be edited, to generate speech information for speech recognition for editing.

Then, the editing correspondence processing unit 48 supplies the speech information for speech recognition for editing, to the speech recognition unit 43 to perform the speech recognition. In this way, the speech recognition unit 43 acquires the speech recognition result of "I drove your car to station every day" and supplies the speech recognition result to the editing correspondence processing unit 48. The editing correspondence processing unit 48 deletes the speech information other than the object to be edited from the speech recognition result, acquires the word of "station" as replacement information for replacing the word of "airport" deleted from the speech recognition result presented to the user, and transmits the word of "station" to the client terminal 13.

In response to this, as illustrated in FIG. 13, in the client terminal 13, the speech recognition result correspondence processing unit 31 displays the speech recognition result of "I drove your car to station every day" on which the editing by the word of "station" as the replacement information is reflected. Furthermore, the speech recognition result correspondence processing unit 31 displays a user interface of "POSSIBLY, . . . " presenting other candidates of the replacement information. In this user interface, a GUI for inputting other candidates (stay and attention) of replacement information and a GUI (a button of AS IT IS) for instructing to determine editing by the word of the "station" of replacement information are displayed.

In a case where editing by the word of the "station" of replacement information is determined with respect to such a user interface, a touch operation is performed on the button of AS IT IS. In response to this, the speech recognition result correspondence processing unit 31 is able to determine the speech recognition result of "I drove your car to station every day" reflecting the editing by the word of the "station" of the replacement information. Note that, in addition, the editing by the word of the "station" of the replacement information may be determined on the basis of speech (utterance of "AS IT IS"), gaze, and the like.

Note that it is sufficient that at least one piece of speech information for speech recognition for editing is generated, and for example, a plurality of pieces of speech information may be generated in several patterns. Also, although only one piece of speech information of the repeated utterance is described, a plurality of pieces of speech information may be used. In this case, speech information for speech recognition for editing is generated in several patterns.

For example, in order to improve the accuracy of the speech recognition, the editing correspondence processing unit 48 is able to add specific speech information before a portion to which the speech information of the repeated utterance is connected, to generate the speech information for speech recognition for editing.

Figure 14:
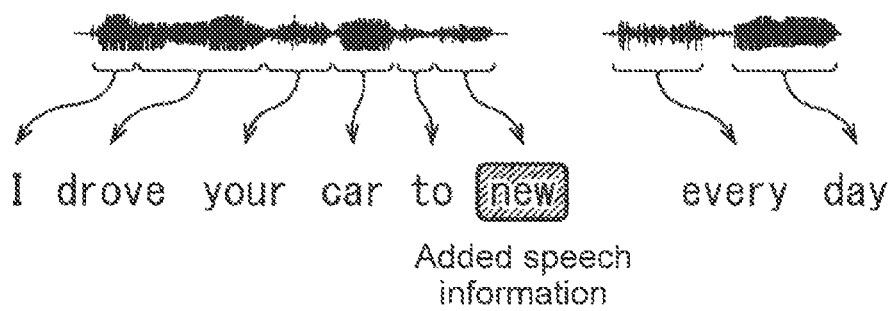
FIG. 14 is a diagram for describing an example of adding specific speech information before a portion to which speech information of the repeated utterance is connected.

For example, as illustrated in FIG. 14, the editing correspondence processing unit 48 may add the speech information of "new" before the portion to which the speech information of the repeated utterance is connected, perform processing of connecting the speech information of the "station" of the repeated utterance following the speech information of the "new", to generate the speech information for speech recognition for editing. For example, since the part of speech in the word of the "airport" recognized by the preliminary language processing is a noun, there is a high possibility that the noun is inserted to a deleted portion, so that the editing correspondence processing unit 48 adds the speech information of the "new". Also, the editing correspondence processing unit 48 is able to add the speech information saved when the user has given an utterance in the past as the speech information of the "new", add the speech information acquirable through the network 12 to be connected, or add speech information generated by synthetic speech (TTS).

Then, since the speech information of the "new" is added before the portion to which the speech information of the repeated utterance is connected, in a case where the speech recognition unit 43 performs the speech information for speech recognition for editing, it is possible to improve the accuracy of recognizing the speech information of the repeated utterance.

<Speech Information for Speech Recognition for Editing Using Sound Information Other Than Utterance>

Figure 15:
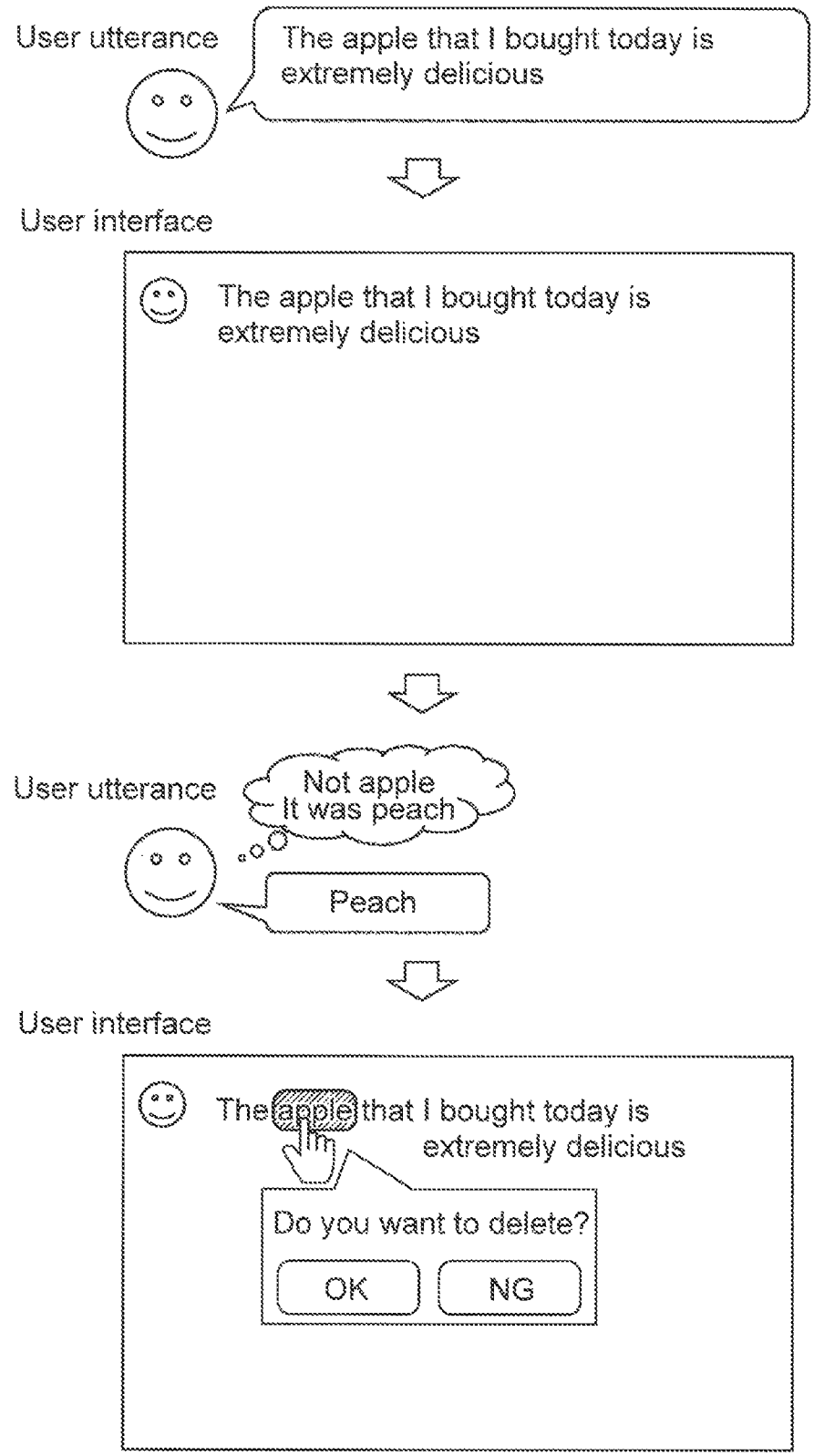
FIG. 15 is a diagram illustrating an example of a user interface for editing a speech recognition result.
Figure 17:
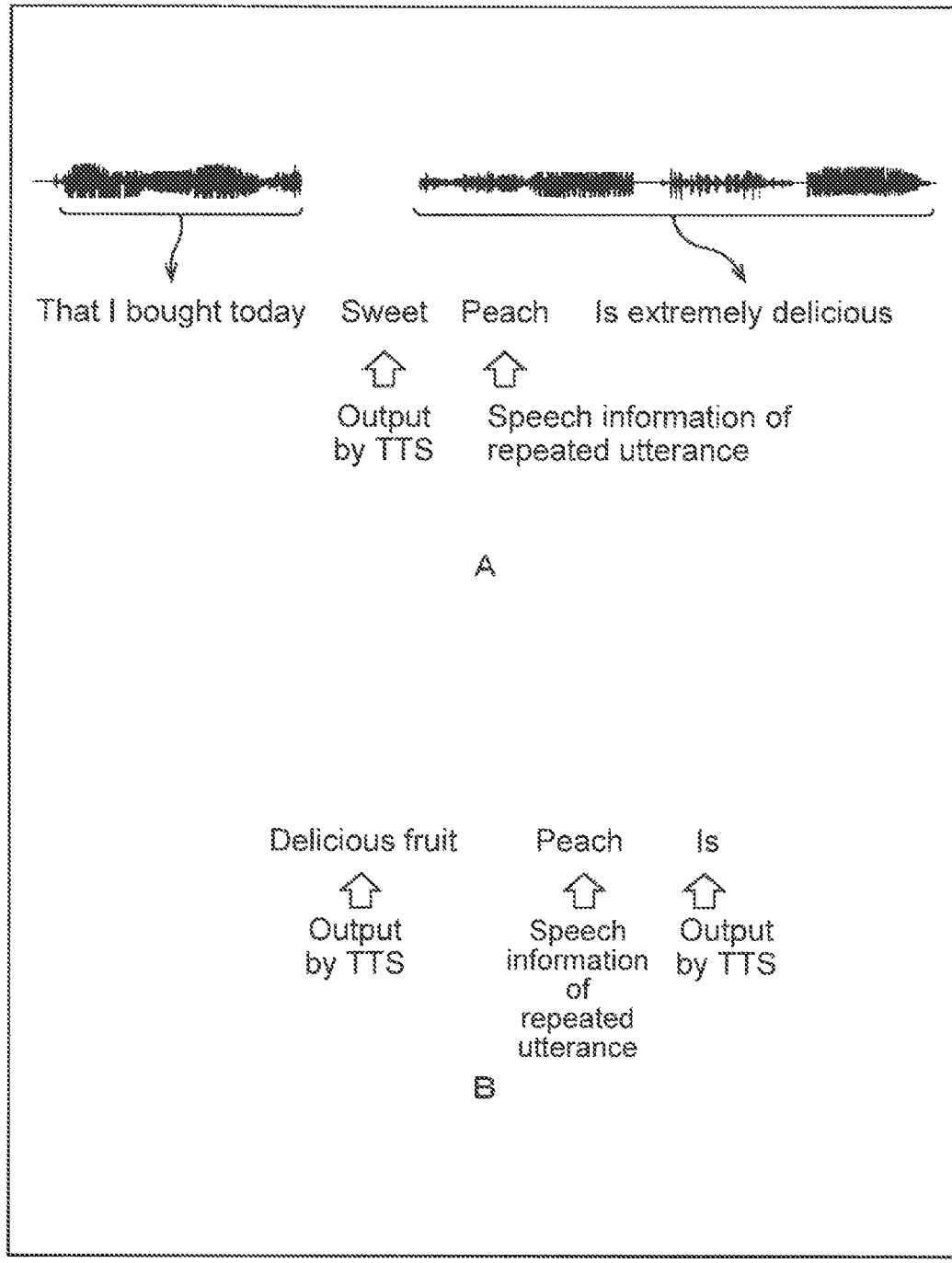
FIG. 17 is a diagram for describing an example of speech information for speech recognition for editing, using sound information other than the utterance.

With reference to FIGS. 15 to 17, there will be described an example in which sound information other than the utterance is used for speech information for speech recognition for editing to perform processing of speech recognition on speech information of the repeated utterance.

As illustrated in FIG. 15, for example, the user gives an utterance of "THE APPLE THAT I BOUGHT TODAY IS EXTREMELY DELICIOUS" to the client terminal 13, and the result of the speech recognition is displayed on the image output unit 22 of the client terminal 13.

In a case where the user desires to edit the word of the "APPLE" displayed on the image output unit 22 to the word of "PEACH" with respect to such a speech recognition result, the user touches and holds a portion where the word of "APPLE" desired to be edited is displayed. In this way, the speech recognition result correspondence processing unit 31 specifies the word as an object to be edited.

Then, the speech recognition result correspondence processing unit 31 displays a user interface of "DO YOU WANT TO DELETE?" for confirming the deletion of the word for the word of the "APPLE" specified as an object to be edited. Also, in the user interface, a GUI (OK button/NG button) for inputting the confirmation result by the user is displayed.

In a case where the user agrees to delete the word of the "APPLE" specified as an object to be edited with respect to such a user interface, the user performs a touch operation on the OK button and performs a repeated utterance of "PEACH". In response to this, the speech information acquiring unit 21 acquires speech information of the repeated utterance based on the repeated utterance of the "PEACH" of the user and transmits speech information of the repeated utterance to the speech recognition server 14.

At this time, as illustrated in FIG. 16, referring to a database in which the part of speech and a category are associated with each other and a database in which a category, information which is easily attached, and a model of a sentence are associated with one another, the editing correspondence processing unit 48 generates speech information for speech recognition for editing.

Then, in a case where the repeated utterance of the "PEACH" of the user is associated with a category of "FRUIT NAME", the editing correspondence processing unit 48 is able to generate a string of texts in accordance with the information of "SWEET" which is easily attached to the category of the "FRUIT NAME", as speech information for speech recognition for editing. For example, the editing correspondence processing unit 48 generates a string of texts of "THE SWEET PEACH THAT I BOUGHT TODAY IS EXTREMELY DELICIOUS", as illustrated in A of FIG. 17. Among such a string of texts, speech information uttered by the user is used for "THAT I BOUGHT TODAY" and "IS EXTREMELY DELICIOUS", "SWEET" is output by the synthetic speech (TTS), and the speech information of the repeated utterance of the user is used for the "PEACH".

Also, the editing correspondence processing unit 48 is able to generate a string of texts according to a model of "DELICIOUS FRUIT+IS+(TARGET TEXTS)" of a sentence associated with the category of the "FRUIT NAME" of the repeated utterance of the "PEACH" of the user, as speech information for speech recognition for editing. For example, the editing correspondence processing unit 48 generates a string of texts of "DELICIOUS FRUIT IS PEACH", as illustrated in B of FIG. 17. Among such a string of texts, "DELICIOUS FRUIT" and "IS" are output as synthetic speech (TTS), and speech information of the repeated utterance of the user is used for "MOMO".

In this way, the editing correspondence processing unit 48 is able to generate speech information for speech recognition for editing, using synthetic speech (TTS) as sound information other than the utterance, and perform speech recognition on speech information of the repeated utterance. In this way, for example, the editing correspondence processing unit 48 is able to improve the accuracy of the speech recognition than that of the speech recognition for a single entity of the speech information of the repeated utterance.

That is, since the speech information of the repeated utterance is connected to sound information other than the utterance, synthetic information representing information which is easily attached to the category, synthetic speech representing a sentence generated from a model of the sentence, and the like as described above, the speech recognition system 11 is capable of performing speech recognition on the repeated utterance with high accuracy.

Furthermore, as described above, it is possible to apply the speech recognition system 11 to a case of performing editing (editing of "airport" to "station") for exchanging a word on the basis of the repeated utterance of the user, as well as a case of performing various editing based on the repeated utterance of the user.

For example, as illustrated in FIG. 18, the speech recognition system 11 is able to perform editing of the utilization of a verb (editing of "like" to "liked"), or editing of a change in a noun (editing of "cars" to "car") on the basis of the repeated utterance of the user. Also, the speech recognition system 11 is able to edit an error due to a similar sound (edit "He" to "She") based on the repeated utterance of the user. Also, the speech recognition system 11 is able to edit a recognition failure in units of a phrase (edit "had" to "would like") based on the repeated utterance of the user.

Then, since such speech information of the repeated utterance by the user is connected to speech information other than the speech information of the repeated utterance, the speech recognition system 11 is capable of performing speech recognition on the repeated utterance with high accuracy.

For example, in a case where speech recognition is performed using only speech information of the repeated utterance when editing an error due to a similar sound (for example, editing of "He" to "She"), it is considered that speech recognition is easy to fail (for example, it will be easy to erroneously recognize it as "C" or "See"). On the contrary, the speech recognition system 11 connects speech information of the repeated utterance to sound information other than the utterance and performs speech recognition on the entire speech information, so that it is possible to avoid a failure of such speech recognition.

Note that, as another example of editing an error due to a similar sound, when a result of "I want to go to a hospital to die" of the speech recognition on the utterance of "I want to go to a hospital to day" of the user is obtained, the speech recognition system 11 is able to edit an error (edit "die" to "day") on the basis of the repeated utterance of the user.

By the way, no matter how high the accuracy of speech recognition technology is, there is a case where the speech recognition result is not a result as expected. For example, since the human's memory is not perfect, the utterance including an error is performed, so that, even though speech recognition is successful, the speech recognition result including the error is not a result as expected. Also, even though the speech recognition result including such an error is presented, it is considered that the human is unable to notice an error of the content.

On the contrary, the speech recognition system 11 estimates a correction portion for the utterance including an error by collating action information, weather information, and the like, and presents the correction portion, so that it is possible to easily notice an error as described. In this way, it is possible to improve the accuracy of a speech correction system in the speech recognition system 11.

Furthermore, when the repeated utterance is performed using, as an edited portion, one portion of the string of texts obtained as a result of speech input as a correction portion, thereby reflecting editing, even though speech recognition is performed only on a repeated portion, once it is not possible to utilize utterance context included in an original utterance, it is considered that the accuracy of the recognition becomes lower and correction is not performed as expected.

On the contrary, since speech information other than the speech information of the repeated utterance is connected to the speech information of the repeated utterance, the speech recognition system 11 is capable of performing speech recognition on the repeated utterance with high accuracy by utilizing the utterance context included in the original utterance.

<Processing in Client Terminal>

Figure 19:
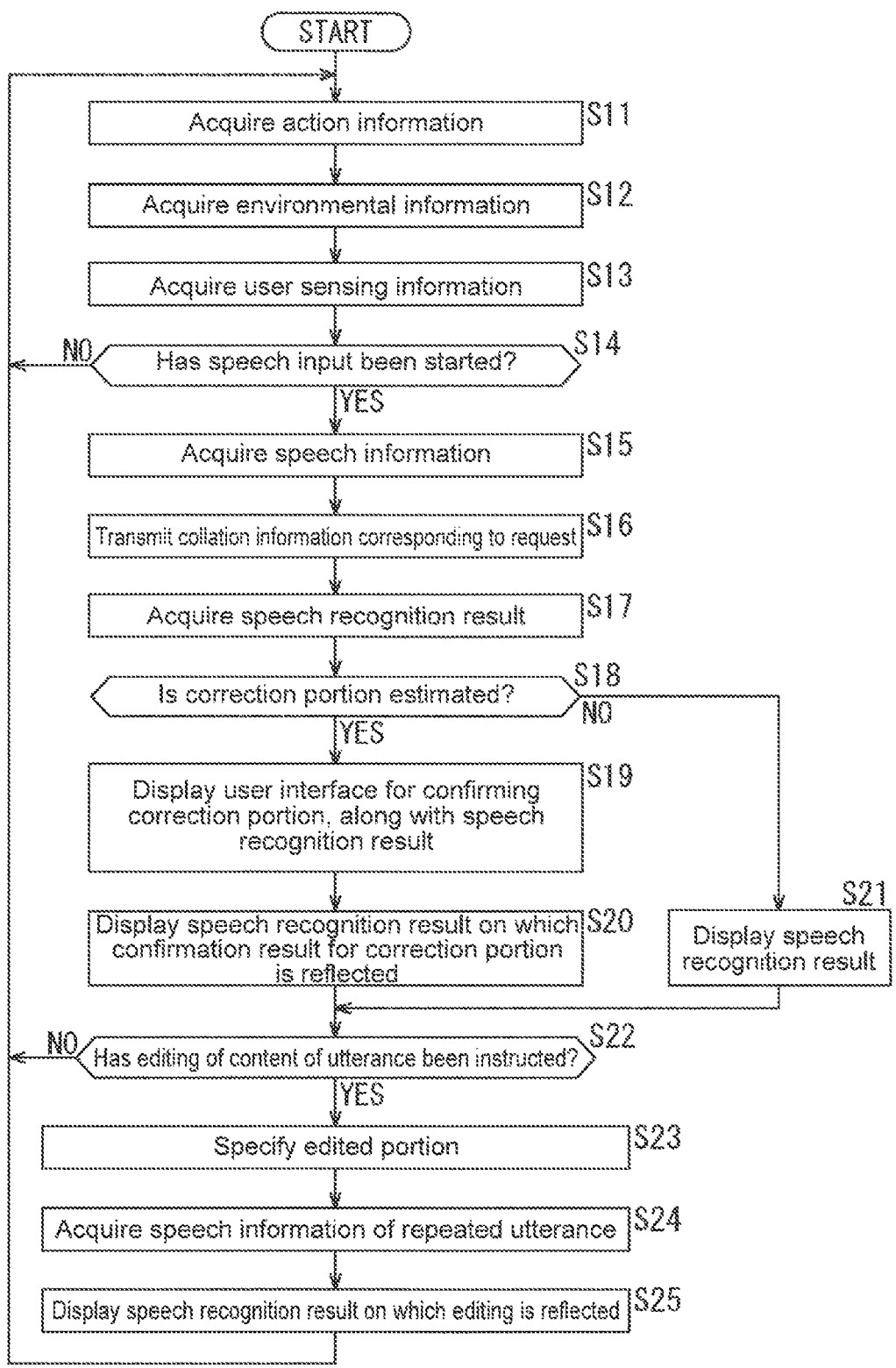
FIG. 19 is a flowchart for describing processing executed in a client terminal.

FIG. 19 is a flowchart for describing processing executed in the client terminal 13.

For example, the client terminal 13 always performs processing in a background even when the user is not performing speech input. In step S11, the action information acquiring unit 25 acquires action information indicating the action of the user, and records the action information in the recording unit 29.

In step S12, the environmental information acquiring unit 26 acquires environmental information indicating the surrounding environment of the user, and records the environmental information in the recording unit 29.

In step S13, the gaze information acquiring unit 27 acquires gaze information indicating a direction of a gaze of the user, and the object recognition unit 28 acquires object recognition information indicating a recognition result of an object visually recognized by the user. Then, the gaze information and the object recognition information are recorded in the recording unit 29 as user sensing information obtained as a result of sensing the user.

In step S14, the speech information acquiring unit 21 determines whether or not the speech input has been started by the user. For example, once a specific operation is performed on a button (not illustrated), or a user utters a specific keyword instructing the start of the speech input, the speech information acquiring unit 21 is able to determine that the speech input has been started by the user.

In a case where the speech information acquiring unit 21 determines in step S14 that speech input by the user has not been started, the processing returns to step S11, and the above-described processing is repeatedly performed. On the other hand, in a case where the speech information acquiring unit 21 determines in step S14 that the speech input has been started, the processing proceeds to step S15.

In step S15, the speech information acquiring unit 21 acquires speech information based on the utterance of the user. Then, the speech information acquiring unit 21 supplies the speech information to the communication unit 30, and the communication unit 30 transmits the speech information to the speech recognition server 14 through the network 12.

In step S16, the communication unit 30 transmits collation information corresponding to a request (for example, step S35 in FIG. 20 to be described later) by the collation information acquiring unit 47 of the speech recognition server 14, to the speech recognition server 14 through the network 12. As described above, the action information, the environmental information and the user sensing information are recorded in the recording unit 29, and from among information, the communication unit 30 reads out information corresponding to a request by the collation information acquiring unit 47, and transmits the corresponding information as collation information, to the speech recognition server 14.

In step S17, the communication unit 30 acquires a speech recognition result that has been transmitted in step S39 or from the speech recognition server 14 in step S39 of FIG. 20 to be described later, and supplies the speech recognition result to the speech recognition result correspondence processing unit 31. Here, in the speech recognition server 14, in the case where it is estimated that there is a correction portion that needs to be corrected for the speech recognition result, information for confirming the correction portion is added to the speech recognition result.

In step S18, the speech recognition result correspondence processing unit 31 determines whether or not it is estimated that there is a correction portion for the speech recognition result, on the basis of whether or not information for confirming the correction portion is added to the speech recognition result.

In a case where the speech recognition result correspondence processing unit 31 determines in step S18 that it is estimated that there is a correction portion for the speech recognition result, the processing proceeds to step S19.

In step S19, the speech recognition result correspondence processing unit 31 causes the image output unit 22 to display a sentence indicating the speech recognition result, and generates the user interface for confirming the correction portion to be displayed on the image output unit 22. In this user interface, as described above with reference to FIGS. 4 to 9, a GUI (button) for accepting confirmation of correction by the user is displayed.

In step S20, the operation input unit 23 supplies, to the speech recognition result correspondence processing unit 31, operation information indicating the content of the operation input by the touch operation by the user, with respect to the GUI for accepting confirmation of correction by the user. Then, in accordance with the operation information, the speech recognition result correspondence processing unit 31 causes the image output unit 22 to display the speech recognition result on which the confirmation result for the correction portion is reflected.

On the other hand, in a case where the speech recognition result correspondence processing unit 31 determines in step S18 that it is not estimated that there is a correction portion for the speech recognition result, the processing proceeds to step S21, and the speech recognition result correspondence processing unit 31 causes the image output unit 22 to display a sentence indicating the speech recognition result.

After the processing of step S20 or S21, the processing proceeds to step S22, and the speech recognition result correspondence processing unit 31 determines whether or not the user has instructed editing of the content of the utterance for the speech recognition result displayed on the image output unit 22. For example, as described above with reference to FIG. 11, the user touches and holds a portion where a word desired to be edited in the sentence indicated by the speech recognition result is displayed. Once the operation information corresponding to a touch operation is supplied from the operation input unit 23, the speech recognition result correspondence processing unit 31 is able to determine that the user has instructed to edit the content of the utterance.

In a case where the speech recognition result correspondence processing unit 31 determines in step S22 that the user has instructed to edit the content of the utterance, the processing proceeds to step S23.

In step S23, the speech recognition result correspondence processing unit 31 specifies an edited portion based on the operation information, that is, a word to be edited. Then, as described with reference to FIG. 11, the speech recognition result correspondence processing unit 31 displays a user interface for confirming deletion of the word. Thereafter, once the user performs an operation of agreeing to delete a word specified as an object to be edited, the speech recognition result correspondence processing unit 31 transmits information indicating the deletion of the word specified as the object to be edited, to the speech recognition server 14.

In step S24, as described with reference to FIG. 12, the speech recognition result correspondence processing unit 31 displays a user interface for urging the repeated utterance on the image output unit 22. Then, the speech information acquiring unit 21 acquires the speech information of the repeated utterance based on the utterance of the user, and transmits the speech information to the speech recognition server 14.

In step S25, the speech recognition result correspondence processing unit 31 acquires replacement information that has been transmitted from the speech recognition server 14 in step S56 of FIG. 21, to be described later, through the communication unit 30. Then, the speech recognition result correspondence processing unit 31 displays the speech recognition result on which the editing is reflected by replacing the replacement information with the edited portion, on the image output unit 22.

After the processing in step S25 or in a case where it is determined in step S22 that editing of the uttered content is not instructed by the user, the processing returns to step S11, and the same processing is repeated thereafter.

<Processing in Speech Recognition Server>

Figure 20:
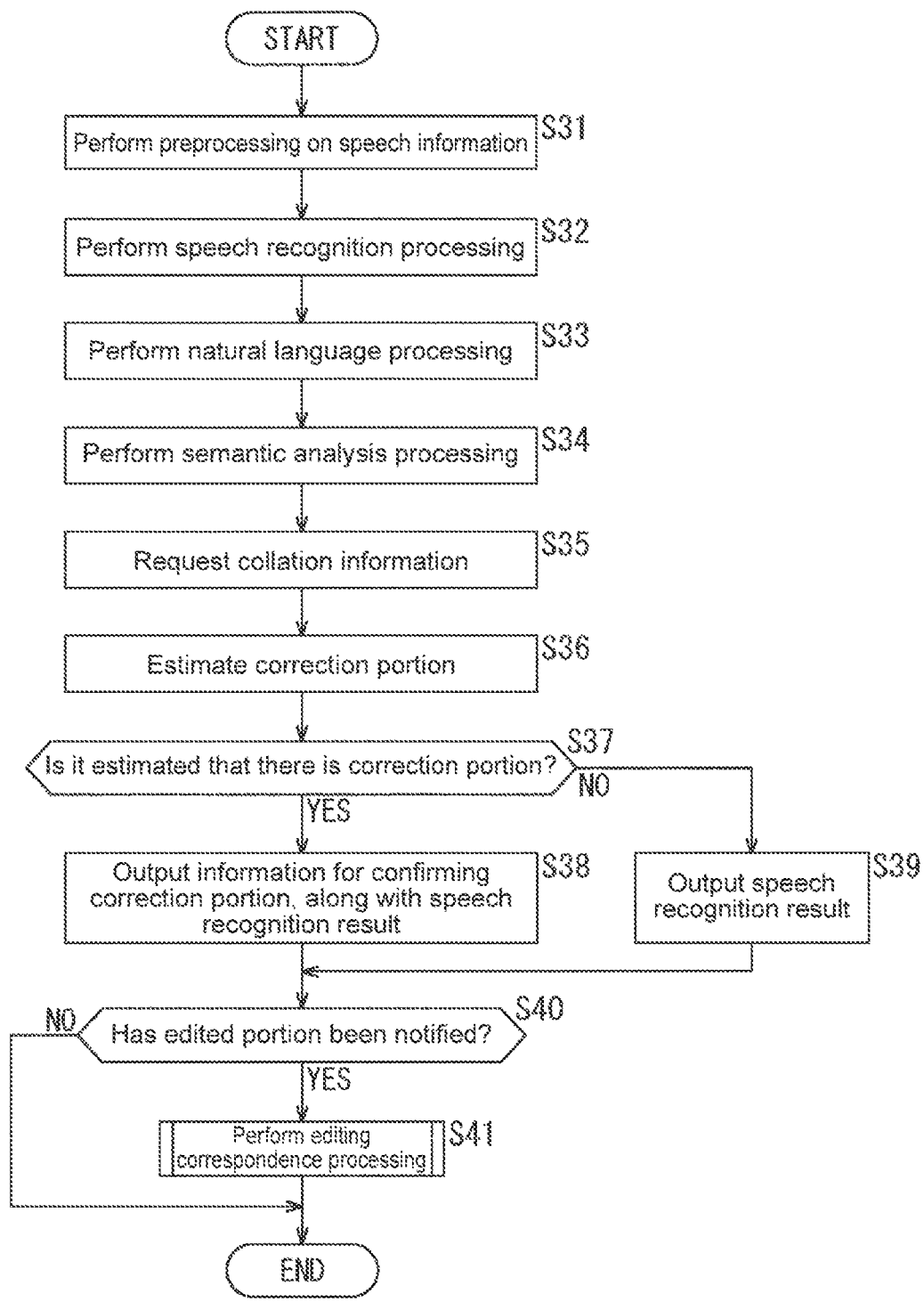
FIG. 20 is a flowchart for describing processing executed in a speech recognition server.
Figure 21:
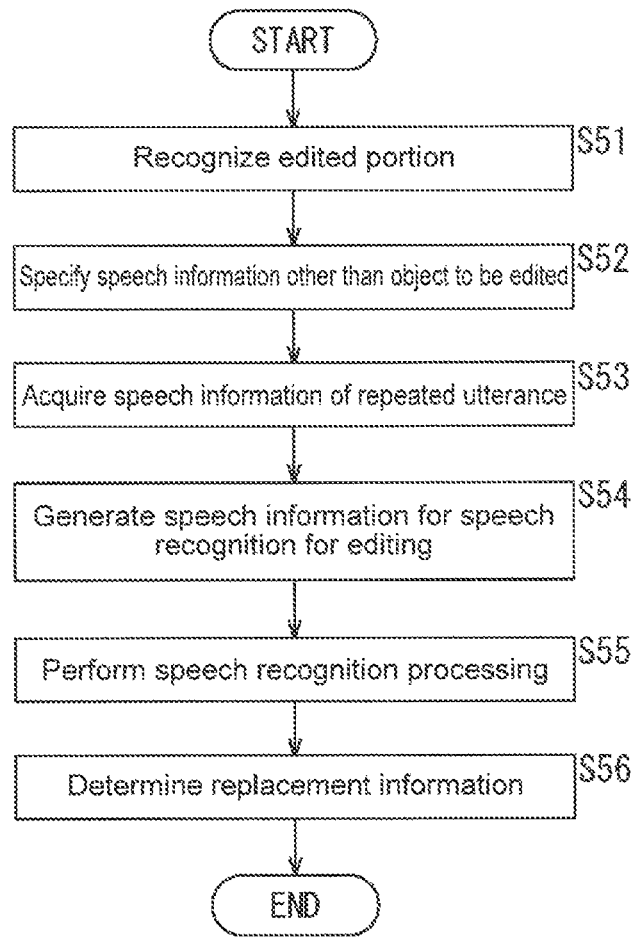
FIG. 21 is a flowchart for describing editing correspondence processing.

FIG. 20 and FIG. 21 are flowcharts for describing processing executed in the speech recognition server 14.

For example, once the communication unit 41 receives the speech information that has been transmitted from the client terminal 13 in step S15 of FIG. 19, and supplies the speech information to the input sound processing unit 42, the processing is started. In step S31, the input sound processing unit 42 performs preprocessing such as VAD processing on the speech information that has been supplied from the communication unit 41, and supplies the speech information to the speech recognition unit 43.

In step S32, the speech recognition unit 43 performs speech recognition processing on the speech information that has been supplied from the input sound processing unit 42 in step S31. Then, the speech recognition unit 43 supplies the sentence obtained as the speech recognition result to the natural language processing unit 44.

In step S33, the natural language processing unit 44 performs natural language processing on the sentence representing the speech recognition result that has been supplied from the speech recognition unit 43 in step S32, and outputs the speech recognition result subjected to natural language processing to the semantic analysis processing unit 45.

In step S34, the semantic analysis processing unit 45 performs semantic analysis processing of analyzing the meaning of the sentence representing the speech recognition result that has been supplied from the natural language processing unit 44 in step S33, and supplies a content of the sentence indicated by the speech recognition result, to the correction portion estimation processing unit 46.

In step S35, the correction portion estimation processing unit 46 recognizes collation information required for determining the accuracy of the content of the sentence indicated by the speech recognition result that has been supplied from the semantic analysis processing unit 45 in step S34, and the collation information acquiring unit 47 requests the collation information through the communication unit 41. For example, the collation information acquiring unit 47 requests action information, environmental information, gaze information, object recognition information, and the like as collation information, to the client terminal 13, or requests fact information to the news server 15 and the encyclopedia server 16. Then, the collation information acquiring unit 47 acquires collation information that has been transmitted in response to a request, through the communication unit 41, and supplies the collation information to the correction portion estimation processing unit 46.

In step S36, the correction portion estimation processing unit 46 collates the content of the sentence indicated by the speech recognition result with the collation information that has been acquired in step S35, and performs processing of estimating a correction portion for the sentence.

The correction portion estimation processing unit 46 determines in step S37 whether or not it is estimated that there is a correction portion in the sentence indicated by the speech recognition result as a result of the processing in step S35.

In a case where the correction portion estimation processing unit 46 determines in step S37 that there is a correction portion in the sentence indicated by the speech recognition result, the processing proceeds to step S38. In step S38, the correction portion estimation processing unit 46 supplies the information indicating the correction portion along with the speech recognition result, to the speech recognition result output processing unit 49, and the speech recognition result output processing unit 49 outputs information for confirming the correction portion, along with the speech recognition result.

On the other hand, in a case where the correction portion estimation processing unit 46 determines in step S37 that there is no correction portion in the sentence indicated by the speech recognition result, the processing proceeds to step S39. In step S39, the correction portion estimation processing unit 46 supplies the speech recognition result to the speech recognition result output processing unit 49, and the speech recognition result output processing unit 49 outputs the speech recognition result.

After the processing of step S38 or S39, the processing proceeds to step S40, and the editing correspondence processing unit 48 determines whether or not the edited portion has been notified by the client terminal 13. For example, once information indicating the deletion of the word specified as the object to be edited is transmitted from the client terminal 13 in step S23 of FIG. 19 described above, the editing correspondence processing unit 48 determines that the edited portion has been notified.

In a case where the editing correspondence processing unit 48 determines in step S40 that the edited portion has been notified, the processing proceeds to step S41, and the processing is ended after the editing correspondence processing is performed. In a case where it is determined that the edited portion has not been notified, the processing is ended as it is.

FIG. 21 is a flowchart for describing editing correspondence processing performed in step S41 of FIG. 20.

In step S51, the editing correspondence processing unit 48 recognizes the edited portion in accordance with the information indicating the deletion of the word specified as the object to be edited, that has been transmitted from the client terminal 13.

In step S52, as described above with reference to FIG. 11, the editing correspondence processing unit 48 deletes phoneme information associated with the word of the edited portion that has been recognized in step S51, from the speech information maintained in the speech recognition server 14. In this way, the editing correspondence processing unit 48 specifies the speech information other than the object to be edited.

In step S53, the editing correspondence processing unit 48 acquires the speech information of the repeated utterance that has been transmitted from the client terminal 13 in step S24 of FIG. 19 described above.

In step S54, the editing correspondence processing unit 48 performs processing of connecting the speech information of the repeated utterance acquired in step S53 to the edited portion in which the word is deleted in the speech information other than the object to be edited that has been recognized in step S52, to generate speech information for speech recognition for editing.

In step S55, the editing correspondence processing unit 48 supplies the speech information for speech recognition for editing that has been generated in step S54 to the speech recognition unit 43 and causes the speech recognition unit 43 to perform speech recognition.

In step S56, the editing correspondence processing unit 48 deletes the speech information other than the object to be edited from the speech recognition result obtained by performing speech recognition in step S55, and determines the remaining speech information as replacement information to replace the edited portion. Then, the editing correspondence processing unit 48 transmits the replacement information to the client terminal 13 through the communication unit 41. In response to this, after the replacement information is replaced with the edited portion of the speech recognition result in step S25 of FIG. 19 described above, and the editing is reflected, the editing correspondence processing is ended.

As described above, the client terminal 13 and the speech recognition server 14 are able to display the user interface for confirming the correction portion estimated on the basis of the action information of the user, the weather information, and the like, along with the speech recognition result for speech information based on the utterance of the user. In this way, it is possible to easily correct incorrect speech input due to a user's memory error and the like.

Also, the client terminal 13 and the speech recognition server 14 are able to perform speech recognition on speech information for speech recognition for editing in which the speech information of the repeated utterance of the edited portion instructed by the user is connected to the speech information other than the object to be edited. Therefore, for example, the speech recognition server 14 is capable of improving the accuracy of speech recognition, as compared with a configuration such that speech recognition is performed using only speech information of the repeated utterance.

In this way, the speech recognition system 11 is capable of more accurately estimating a correction portion, presenting the correction portion to the user, and performing speech recognition on an edited portion with high accuracy. In this way, the speech recognition system 11 is able to provide a more convenient speech recognition service.

Therefore, for example, the speech recognition service provided by the speech recognition system 11 is able to be generally used in an application that provides a user interface for performing speech input. For example, since the speech recognition service provided by the speech recognition system 11 is used in a virtual agent system or the like, a lie is estimated as a correction portion and is correctable by the user in a case where the lie is included in the utterance of the user.

For example, in a case where the user performs an utterance of "IT IS COLD TODAY", the utterance is collated with environmental information indicating a temperature acquired by the environmental information acquiring unit 26, and at that time when the temperature is 38 degrees, the speech recognition system 11 is able to estimate the word of "COLD" of the speech recognition result as a correction portion.

Note that, in the present embodiment, as described with reference to FIG. 1, the speech recognition system 11 is configured with the client terminal 13 and the speech recognition server 14 connected through the network 12, and the speech recognition service as described above is provided. The present invention is not limited to this configuration. For example, the speech recognition system may be configured with the client terminal 13 as the single entity, or the speech recognition service may be provided without performing communication through the network 12.

Also, each block for configuring the client terminal 13 and the speech recognition server 14 may be disposed on either side of the network 12 as long as each block is able to provide the speech recognition service as the entire speech recognition system 11.

Note that each processing described above with reference to the flowcharts needs not to necessarily be processed in chronological order in accordance with the order described as the flowcharts, and may include processing executed in parallel or individually (for example, processing executed in parallel or processing by an object). Also, the program may be processed by a single CPU or may be processed to be distributed by a plurality of CPUs.

Also, the above-described series of processing (information processing method) may be executed by hardware or may be executed by software. In a case where the series of processing is executed by software, a program recording medium on which a program is recorded is installed at a computer in which a program configuring the software is incorporated in dedicated hardware, or a general-purpose personal computer or the like, for example, that is capable of executing various kinds of functions by installing various kinds of programs.

Figure 22:
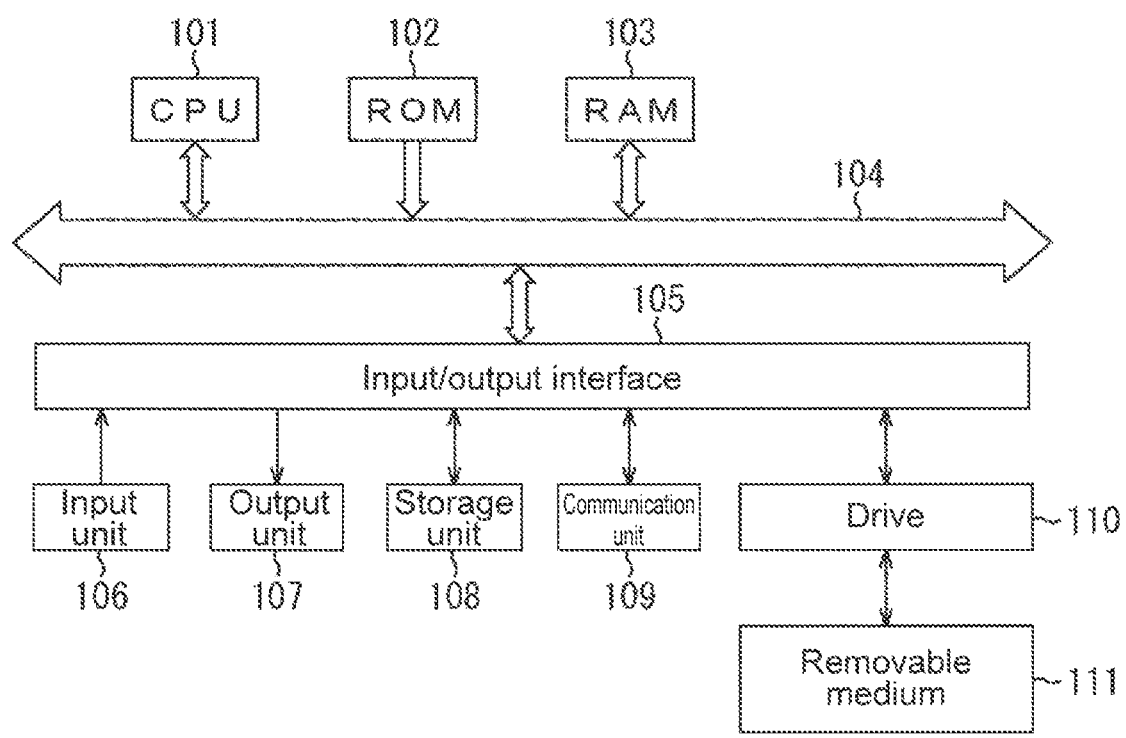
FIG. 22 is a block diagram illustrating a configuration example of an embodiment of a computer to which the present technology is applied.

FIG. 22 is a block diagram illustrating an example of a hardware configuration of a computer that executes the above-described series of processing by a program.

In the computer, a Central Processing Unit (CPU) 101, a Read Only Memory (ROM) 102, and a Random Access Memory (RAM) 103 are mutually connected through a bus 104.

An input/output interface 105 is further connected to the bus 104. An input unit 106 including a keyboard, a mouse, a microphone, and the like, an output unit 107 including a display, a speaker, and the like, a storage unit 108 including a hard disk and a nonvolatile memory, a communication unit 109 including a network interface and the like, and a drive 110 for driving a removable medium 111 such as a magnetic disk, an optical disk, a magneto-optical disk, or a semiconductor memory, are connected to the input/output interface 105.

In the computer configured as described above, for example, the CPU 101 performs the above-described series of processing by loading a program stored in the storage unit 108 into the RAM 103 through the input/output interface 105 and the bus 104 and executing the program.

The program to be executed by the computer (CPU 101) is recorded on a removable medium 111 that is a package medium including, for example, a magnetic disk (including a flexible disk), an optical disk (a Compact Disc-Read Only Memory (CD-ROM)), a Digital Versatile Disc (DVD), and the like), a magneto-optical disk, or a semiconductor memory or the like, or is provided through a wired or radio transmission medium referred to as a local area network, the Internet, or a digital satellite broadcast.

Then, by installing the removable medium 111 in the drive 110, it is possible to install the program in the storage unit 108 through the input/output interface 105. Also, it is possible to receive the program at the communication unit 109 through a wired or radio transmission medium and install the program in the storage unit 108. In addition, it is possible to install the program in the ROM 102 or the storage unit 108 in advance.

Note that the present technology may also have the following configuration.

(1)

An information processing apparatus, including:

a recognition unit that recognizes, as an edited portion, a desired word configuring a sentence presented to a user as a speech recognition result;

a generating unit that acquires speech information repeatedly uttered for editing a word of the edited portion, and performs processing of connecting speech information other than a repeated utterance to the speech information, to generate speech information for speech recognition for editing; and a speech recognition unit that performs speech recognition on the speech information for speech recognition for editing generated by the generating unit.

(2)

The information processing apparatus according to (1) above, further including a replacement information acquiring unit that deletes the speech information other than the repeated utterance from the speech recognition result obtained by performing speech recognition on the speech information for speech recognition for editing by the speech recognition unit, and acquires the speech information of the repeated utterance as replacement information to replace the edited portion.

(3)

The information processing apparatus according to (1) or (2) above, in which a generating unit uses, as the speech information other than the repeated utterance, speech information other than an object to be edited, in which phoneme information corresponding to a word of the edited portion is deleted from speech information representing the entire speech recognition result.

(4)

The information processing apparatus according to (3) above, in which the generating unit adds specific speech information before the edited portion in the speech information other than the object to be edited, and performs processing of connecting the speech information of the repeated utterance following the specific speech information, to generate the speech information for speech recognition for editing.

(5)

The information processing apparatus according to (4) above, in which the generating unit adds the specific speech information in accordance with a part of speech of the word of the edited portion.

(6)

The information processing apparatus according to (4) or (5) above, in which in accordance with a category to which the word of the edited portion belongs, the generating unit adds a word, which is easily attached to the category, as the specific speech information.

(7)

The information processing apparatus according to any one of (1) to (6) above, in which in accordance with the category to which the word of the edited portion belongs, the generating unit uses synthetic speech representing a sentence generated from a model of the sentence associated with the category, to generate the speech information for speech recognition for editing.

(8)

An information processing method, including steps of recognizing, as an edited portion, a desired word configuring a sentence presented to a user as a speech recognition result;

acquiring speech information repeatedly uttered for editing a word of the edited portion and performing processing of connecting speech information other than a repeated utterance to the speech information, to generate speech information for speech recognition for editing; and performing speech recognition on the generated speech information for speech recognition for editing.

(9)

A program that causes a computer to execute information processing including steps of recognizing, as an edited portion, a desired word configuring a sentence presented to a user as a speech recognition result, acquiring speech information repeatedly uttered for editing a word of the edited portion and performing processing of connecting speech information other than a repeated utterance to the speech information, to generate speech information for speech recognition for editing, and performing speech recognition on the generated speech information for speech recognition for editing.

Note that the present embodiment is not limited to the aforementioned embodiments, and various modifications are applicable without departing from the spirit of the present disclosure.

REFERENCE SIGNS LIST 11 speech recognition system
12 network
13 client terminal
14 speech recognition server
15 news server
16 encyclopedia server
21 speech information acquiring unit
22 image output unit
23 operation input unit
24 speech output unit
action information acquiring unit
26 environmental information acquiring unit
27 gaze information acquiring unit
28 object recognition unit
29 recording unit
30 communication unit
31 speech recognition result correspondence processing unit
41 communication unit
42 input sound processing unit
43 speech recognition unit
44 natural language processing unit
45 semantic analysis processing unit
46 correction portion estimation processing unit
47 collation information acquiring unit
48 editing correspondence processing unit
49 speech recognition result output processing unit

The invention claimed is:

1. An information processing apparatus, comprising:
a recognition unit configured to
recognize a string of words configuring a sentence presented to a user as a speech recognition result, and
specify a correspondence relationship between each word of the string of words and phoneme information;
an editing correspondence processing unit configured to specify, as an edited portion, a desired word of the string of words as an object to be edited, and delete the phoneme information of the desired word;
a generating unit configured to acquire speech information repeatedly uttered for replacing the desired word of the edited portion, and perform processing of connecting a portion of speech information of the speech recognition result other than the word of the edited portion where the phoneme information associated with the desired word is deleted to the speech information of the repeated utterance, to generate speech information for speech recognition for editing; and a speech recognition unit configured to perform speech recognition on the speech information for speech recognition for editing generated by the generating unit,
wherein the recognition unit, the editing correspondence processing unit, the generating unit, and the speech recognition unit are each implemented via at least one processor.

2. The information processing apparatus according to claim 1, further comprising
a replacement information acquiring unit configured to delete the speech information other than the speech information repeatedly uttered from the speech recognition result obtained by performing speech recognition on the speech information for speech recognition for editing by the speech recognition unit, and acquire the speech information of the repeated utterance as replacement information to replace the edited portion,
wherein the replacement information acquiring unit is implemented via at least one processor.

3. The information processing apparatus according to claim 1, wherein
the generating unit is further configured to use, as the speech information other than the speech information repeatedly uttered, speech information other than an object to be edited, in which phoneme information corresponding to a word of the edited portion is deleted from speech information representing an entirety of the speech recognition result.

4. The information processing apparatus according to claim 3, wherein
the generating unit is further configured to add specific speech information before the edited portion in the speech information other than the object to be edited, and perform processing of connecting the speech information of the repeated utterance following the specific speech information, to generate the speech information for speech recognition for editing.

5. The information processing apparatus according to claim 4, wherein
the generating unit is further configured to add the specific speech information in accordance with a part of speech of the word of the edited portion.

6. The information processing apparatus according to claim 4, wherein
in accordance with a category to which the word of the edited portion belongs, the generating unit is further configured to add a word, which is easily attached to the category, as the specific speech information.

7. The information processing apparatus according to claim 1, wherein
in accordance with a category to which the word of the edited portion belongs, the generating unit is further configured to use synthetic speech representing a sentence generated from a model of the sentence associated with the category, to generate the speech information for speech recognition for editing.

8. The information processing apparatus according to claim 1, wherein the speech recognition unit is further configured to perform speech recognition of an utterance of the user, to generate the sentence presented to the user as the speech recognition result.

9. The information processing apparatus according to claim 1, further comprising:
an editing correspondence processing unit configured to delete the word of the edited portion from the sentence presented to the user as the speech recognition result, wherein the generating unit is further configured to perform processing of connecting the speech information repeatedly uttered to a portion of the sentence presented to the user as the speech recognition result where the word of the edited portion is deleted, to generate the speech information for speech recognition for editing, and wherein the editing correspondence processing unit is implemented via at least one processor.

10. An information processing method, comprising:

recognizing a string of words configuring a sentence presented to a user as a speech recognition result;

specifying a correspondence relationship between each word of the string of words and phoneme information;

specifying, as an edited portion, a desired word of the string of words as an object to be edited;

deleting the phoneme information of the desired word;

acquiring speech information repeatedly uttered for replacing the desired word of the edited portion and performing processing of connecting a portion of speech information of the speech recognition result other than the word of the edited portion where the phoneme information associated with the desired word is deleted to the speech information of the repeated utterance, to generate speech information for speech recognition for editing; and performing speech recognition on the generated speech information for speech recognition for editing.

11. A non-transitory computer-readable medium having embodied thereon a program, which when executed by a computer causes the computer to execute an information processing method, the method comprising:

recognizing a string of words configuring a sentence presented to a user as a speech recognition result;

specifying a correspondence relationship between each word of the string of words and phoneme information;

specifying, as an edited portion, a desired word of the string of words as an object to be edited;

deleting the phoneme information of the desired word;

acquiring speech information repeatedly uttered for replacing the desired word of the edited portion and performing processing of connecting a portion of speech information of the speech recognition result other than the word of the edited portion where the phoneme information associated with the desired word is deleted to the speech information of the repeated utterance, to generate speech information for speech recognition for editing; and performing speech recognition on the generated speech information for speech recognition for editing.

* * * * *